US012449741B2

(12) United States Patent
Shino et al.

(10) Patent No.: US 12,449,741 B2
(45) Date of Patent: Oct. 21, 2025

(54) TONER

(71) Applicant: CANON KABUSHIKI KAISHA, Tokyo (JP)

(72) Inventors: Megumi Shino, Chiba (JP); Takeshi Hashimoto, Ibaraki (JP); Yukihiro Abe, Chiba (JP); Miki Ueda, Tokyo (JP); Hayato Ida, Ibaraki (JP); Kazuki Murata, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 786 days.

(21) Appl. No.: 17/664,102

(22) Filed: May 19, 2022

(65) Prior Publication Data

US 2022/0413406 A1 Dec. 29, 2022

(30) Foreign Application Priority Data

Jun. 11, 2021 (JP) ................................ 2021-098007
May 10, 2022 (JP) ................................ 2022-077313

(51) Int. Cl.
*G03G 9/08* (2006.01)
*G03G 9/087* (2006.01)

(52) U.S. Cl.
CPC ......... *G03G 9/0821* (2013.01); *G03G 9/0802* (2013.01); *G03G 9/0819* (2013.01); *G03G 9/0827* (2013.01); *G03G 9/08711* (2013.01); *G03G 9/08731* (2013.01); *G03G 9/08773* (2013.01)

(58) Field of Classification Search
CPC .. G03G 9/0821; G03G 9/0802; G03G 9/0819; G03G 9/0827; G03G 9/08711; G03G 9/08731; G03G 9/08773
See application file for complete search history.

(56) References Cited

U.S. PATENT DOCUMENTS

| | | | | |
|---|---|---|---|---|
| 9,057,970 | B2 | 6/2015 | Ida | |
| 9,152,088 | B1 | 10/2015 | Kobori | |
| 9,348,247 | B2 | 5/2016 | Ida | |
| 9,348,253 | B2 | 5/2016 | Kanno | |
| 9,417,540 | B2 | 8/2016 | Hashimoto | |
| 9,436,112 | B2 | 9/2016 | Iwasaki | |
| 9,540,483 | B2 | 1/2017 | Ida | |
| 9,575,426 | B2 * | 2/2017 | Shimano | G03G 9/09371 |
| 9,651,883 | B2 | 5/2017 | Hama | |
| 9,665,026 | B2 | 5/2017 | Iwasaki | |
| 9,696,644 | B2 | 7/2017 | Ida | |
| 9,809,682 | B2 * | 11/2017 | Ishizu | G03G 9/09725 |
| 9,897,934 | B2 | 2/2018 | Tamura | |
| 10,012,920 | B2 | 7/2018 | Shibata | |
| 10,036,970 | B2 | 7/2018 | Kanno | |
| 10,078,281 | B2 | 9/2018 | Ida | |
| 10,082,743 | B2 | 9/2018 | Hama | |
| 10,088,765 | B2 | 10/2018 | Miyakai | |
| 10,146,146 | B2 | 12/2018 | Komatsu | |
| 10,175,595 | B2 | 1/2019 | Onozaki | |
| 10,197,936 | B2 | 2/2019 | Onozaki | |
| 10,203,619 | B2 | 2/2019 | Yamashita | |
| 10,228,629 | B2 | 3/2019 | Tamura | |
| 10,274,851 | B2 | 4/2019 | Hashimoto | |
| 10,353,312 | B2 | 7/2019 | Kamae | |
| 10,401,748 | B2 | 9/2019 | Hashimoto | |
| 10,423,086 | B2 | 9/2019 | Hama | |
| 10,451,986 | B2 | 10/2019 | Sano | |
| 10,451,990 | B2 | 10/2019 | Kamae | |
| 10,474,049 | B2 | 11/2019 | Onozaki | |
| 10,514,624 | B2 | 12/2019 | Tamura | |
| 10,564,560 | B2 | 2/2020 | Onozaki | |
| 10,599,060 | B2 | 3/2020 | Kanno | |
| 10,656,545 | B2 | 5/2020 | Kamae | |
| 10,775,710 | B1 | 9/2020 | Kamae | |
| 10,859,931 | B2 | 12/2020 | Hashimoto | |
| 10,877,386 | B2 | 12/2020 | Murayama | |
| 10,969,705 | B2 | 4/2021 | Shirayama | |
| 11,029,617 | B2 | 6/2021 | Chimoto | |
| 11,131,938 | B2 | 9/2021 | Murayama | |
| 11,131,939 | B2 | 9/2021 | Hama | |
| 11,181,848 | B2 | 11/2021 | Ochi | |
| 2001/0046636 | A1 | 11/2001 | Daimon | |
| 2013/0108955 | A1 | 5/2013 | Shibata | |
| 2013/0288173 | A1 | 10/2013 | Hashimoto | |
| 2014/0329176 | A1 | 11/2014 | Kanno | |
| 2015/0099227 | A1 | 4/2015 | Ida | |
| 2018/0113391 | A1 * | 4/2018 | Yamauchi | G03G 9/08795 |
| 2018/0314176 | A1 | 11/2018 | Ikeda | |
| 2021/0055668 | A1 | 2/2021 | Tamura | |
| 2021/0141315 | A1 | 5/2021 | Kamae | |
| 2021/0181647 | A1 | 6/2021 | Hashimoto | |
| 2021/0181649 | A1 | 6/2021 | Kanno | |

(Continued)

FOREIGN PATENT DOCUMENTS

| | | | |
|---|---|---|---|
| JP | 2001-305796 | A | 11/2001 |
| JP | 2014-130243 | A | 7/2014 |

OTHER PUBLICATIONS

U.S. Appl. No. 17/654,461, filed Mar. 11, 2022, Yukihiko Abe. U.S. Appl. No. 17/654,481, filed Mar. 11, 2022, Kazuki Murata.
U.S. Appl. No. 17/656,282, filed Mar. 24, 2022, Takeshi Hashimoto.
U.S. Appl. No. 17/659,084, filed Apr. 13, 2022, Kouichirou Ochi.
U.S. Appl. No. 17/663,935, filed May 18, 2022, Miki Ueda.

*Primary Examiner* — Mark F. Huff
*Assistant Examiner* — Boone Alexander Evans
(74) *Attorney, Agent, or Firm* — VENABLE LLP

(57) ABSTRACT

Provided is a toner comprising: a toner particle containing a binder resin; and an organic silicon polymer particle on a surface of the toner particle, wherein the binder resin contains a crystalline resin, and when the toner particle is pelletized and a Young's modulus of the toner measured in a micro compression test at 25° C. is represented by TE (MPa) and when one organic silicon polymer particle is separated from the toner and a Young's modulus of the one organic silicon polymer particle measured in a micro compression test at 25° C. is represented by SiE (MPa), TE and SiE satisfies $800 \leq TE \leq 2500$ and $1.5 \leq SiE/TE \leq 10.0$.

7 Claims, No Drawings

(56) References Cited

U.S. PATENT DOCUMENTS

| | | | |
|---|---|---|---|
| 2021/0181650 | A1 | 6/2021 | Hama |
| 2021/0181651 | A1 | 6/2021 | Kanno |
| 2021/0278774 | A1 | 9/2021 | Hashimoto |
| 2021/0278775 | A1 | 9/2021 | Kamae |
| 2021/0302853 | A1 | 9/2021 | Murata |
| 2021/0302854 | A1 | 9/2021 | Kitamura |
| 2021/0389688 | A1 | 12/2021 | Shibata |
| 2022/0050398 | A1 | 2/2022 | Ooyama |
| 2022/0187728 | A1 | 6/2022 | Miura |
| 2022/0197163 | A1 | 6/2022 | Kajihara |
| 2022/0197166 | A1 | 6/2022 | Chimoto |
| 2022/0197174 | A1 | 6/2022 | Kajihara |
| 2022/0236654 | A1 | 7/2022 | Watanabe |
| 2022/0236655 | A1 | 7/2022 | Kanno |
| 2022/0236656 | A1 | 7/2022 | Kanno |

* cited by examiner

TONER

BACKGROUND OF THE INVENTION

Field of the Invention

The present invention relates to a toner used in an electrophotographic system, an electrostatic recording system, an electrostatic printing system, and a toner jet system.

Description of the Related Art

In recent years, electrophotographic apparatuses such as a full-color printer and a full-color copier have been demanded to have additional values such as high productivity, high image quality, and high stability more strongly than ever. Under such demands, a so-called tandem method is employed in many cases. In the tandem method, multiple electrophotographic photosensitive bodies are arranged in series and images of respective components are laid one on top of the other on an intermediate transfer body and are transferred together to obtain a full-color image at higher speed. In the tandem method, there are two transfer steps of primary transfer from the photosensitive bodies to the intermediate transfer body and secondary transfer from the intermediate transfer body to a recording material, and a transfer property is thus more important.

Meanwhile, in order to achieve high productivity, it is important to more quickly melt the toner in a fusing step. There is a known a technique in which a crystalline resin with an excellent sharp melting property is used as a main component of a binder resin of the toner.

For example, Japanese Patent Application Laid-Open No. 2001-305796 proposes a toner in which low-temperature fusibility and offset resistance are improved by using a crystalline polyester that includes a sulfonic acid group and that is formed by containing a carboxylic acid having a valence of two or more as a copolymer component.

Moreover, Japanese Patent Application Laid-Open No. 2014-130243 proposes a toner in which both of low-temperature fusibility and heat-resistant preservability are achieved by using an acrylate-based resin with crystallinity in a side chain.

SUMMARY OF THE INVENTION

However, in all of the methods described above, since the crystalline resin that is the main component of the toner has a lower Young's modulus than an amorphous resin, an external additive tends to be buried into the toner particle when images are outputted for a long period. When the external additive is buried into the toner particle, a main body with high adhesive force is exposed and thus transferability of the toner particle to the intermediate transfer body tends to decrease.

Accordingly, a toner that uses a crystalline resin as the main component and that can achieve both of low-temperature fusibility and transferability even when the image output is performed for a long period needs to be developed.

An object of the present invention is to provide a toner that solves the aforementioned problems. Specifically, an object is to provide a toner that suppresses burying of an external additive by using an external additive with a Young's modulus within an appropriate range with respect to a Young's modulus of a toner particle and achieves both of low-temperature fusibility and transferability.

The present invention relates to a toner comprising:

a toner particle containing a binder resin; and an organic silicon polymer particle on a surface of the toner particle, wherein the binder resin contains a crystalline resin, and when a Young's modulus measured with a micro compression tester at 25° C. by using a test piece obtained by pelletizing the toner is represented by TE (MPa) and a Young's modulus measured with the micro compression tester at 25° C. by using one organic silicon polymer particle separated from the toner is represented by SiE (MPa), TE and SiE satisfy $$800 \leq TE \leq 2500, \text{ and}$$

$$1.5 \leq SiE/TE \leq 10.0.$$

According to the present invention, a ratio between the Young's modulus of the toner particle and the Young's modulus of the organic silicon polymer particle is within a specified range and this suppresses burying of the external additive even when images are outputted for a long period. As a result, a toner that can achieve both of low-temperature fusibility and transferability can be provided.

Further features of the present invention will become apparent from the following description of exemplary embodiments.

DESCRIPTION OF THE EMBODIMENTS

In the present invention, the description "XX or more and YY or less" and "XX to YY" which represents a numerical value range means a numerical value range including the lower limit XX and the upper limit YY which are end points unless otherwise noted.

In the present invention, "(meth)acrylic acid ester" means acrylic ester and/or methacrylic acid ester.

In the present invention, a "monomer unit" is such that one section of carbon-carbon bond in a main chain where a vinyl-based monomer in a polymer is polymerized is referred to as one unit. The vinyl-based monomer can be expressed by the following formula (Z).

(Z)

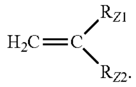

where $R_{Z1}$ represents a hydrogen atom or an alkyl group (preferably, an alkyl group having 1 to 3 carbon atoms, more preferably, a methyl group) and $R_{Z2}$ represents any substituent.

In the present invention, a crystalline resin refers to a resin that has a clear endothermic peak in differential scanning calorimetry (DSC) measurement.

An embodiment of the present invention is described below in detail.

The present invention is a toner that includes toner particles containing a binder resin and organic silicon polymer particles on surfaces of the toner particles, wherein, the binder resin contains the crystalline resin, and when a Young's modulus measured with a micro compression tester at 25° C. by using a test piece obtained by pelletizing the toner is represented by TE (MPa) and a Young's modulus measured with the micro compression tester at 25° C. by using one of the organic silicon polymer particles separated from the toner is represented by SiE (MPa), TE and SiE satisfy $$800 \le TE \le 2500, \text{ and}$$

$$1.5 \le SiE/TE \le 10.0.$$

As a result of conducting earnest studies, the present inventors have found that the aforementioned problems can be solved by controlling a ratio between the Young's modulus of the toner particles containing the crystalline resin and the Young's modulus of the organic silicon polymer particles present on the surface the toner particles, and have come up with the present invention.

The present inventors surmise the reasons why the aforementioned problems are solved as described below.

When a main component of the toner is the crystalline resin, the Young's modulus of the toner particles tends to be low. Moreover, silica particles with a large particle diameter used to improve transferability by a spacer effect are conventionally particles formed only of siloxane bonds (Si—O—Si) and thus have very high crosslink density and a property of being hard. Accordingly, when images with low print density are outputted for a long period by using a toner obtained by combining these particles, the silica particles tend to be buried in surfaces of the toner particles. Particularly, in a two-component developer used by mixing the toner particles and a carrier, the carrier and the silica particles on the toner particle surfaces are rubbed against each other and the silica particles thus tend to be burred into the toner particle surfaces by mechanical stress.

Meanwhile, the organic silicon polymer particles have Si—O—C bonds in addition to siloxane bonds (Si—O—Si) and the Young's modulus can be adjusted by controlling a content ratio of these bonds. Accordingly, the Young's modulus of the organic silicon polymer particles can be controlled with respect to the Young's modulus of the toner particles whose main component is the crystalline resin and crushing and burying of the organic silicon polymer particles can be suppressed by setting the ratio of these bonds within a predetermined range.

When a Young's modulus measured with a micro compression tester at 25° C. by using a test piece obtained by pelletizing the toner is represented by TE (MPa), TE needs to be 800 MPa or more and 2500 MPa or less. When TE is less than 800 MPa, the Young's modulus of the toner particles is too low. The toner particles thereby deform and are united by stress between itself and members such as the carrier and aggregates of the toner particles are formed, thereby causing image defects. Meanwhile, when TE is more than 2500 MPa, deformation is less likely to occur in a fusing step and the toner cannot exhibit sufficient low-temperature fusibility.

Moreover, in the present invention, when a Young's modulus measured with the micro compression tester at 25° C. by using one of the organic silicon polymer particles separated from the toner is represented by SiE (MPa), TE and SiE need to satisfy a condition of $1.5 \le SiE/TE \le 10.0$. When SiE/TE is less than 1.5, the organic silicon polymer particles are too soft relative to the toner particles and the organic silicon polymer particles are crushed by stress between itself and members such as the carrier.

Meanwhile, when SiE/TE is more than 10.0, the organic silicon polymer particles is too hard relative to the toner particles and the organic silicon polymer particles are buried in the toner particles by stress between itself and members such as the carrier. Note that details of measurement methods of TE and SiE are described later.

A proportion of the crystalline resin in the binder resin contained in the toner particle is preferably 50 mass % or more based on the binder resin. When the proportion of the crystalline resin is 50 mass % or more, the proportion of the crystalline resin is sufficiently high and excellent low-temperature fusibility is likely to be obtained.

Moreover, in the present invention, the crystalline resin preferably has a diffraction peak in a range in which a diffraction angle 2θ is 20.0° or more and 22.0° or less in an X-ray diffraction spectrum using a CuKα line. When the crystalline resin that has the diffraction peak within this range is used, the hardness of the toner is improved and burying of an external additive is suppressed, thereby improving the transferability. Note that a measurement method of X-ray diffraction is described later.

In the toner of the present invention, the toner particles preferably have a matrix-domain structure in which a domain of an amorphous resin is dispersed in a matrix of the crystalline resin. Having such a structure can achieve both of an improvement in low-temperature fusibility and suppression of the burying of the external additive in a preferable manner.

In the toner of the present invention, when the toner particles have the aforementioned matrix-domain structure, the domain including the amorphous resin is preferably present in surface layers of the toner particles to have a form more effective for the suppression of burying of the external additive. Specifically, the domain is preferably present within a range of 800 nm from the surfaces of the toner particles. In this case, the number-average particle diameter of the domain is more preferably 20 nm or more and 500 nm or less. Both of an improvement in fusibility and the suppression of burying of the external additive can be achieved in a preferable manner as long as the number-average particle diameter of the domain is within the aforementioned range. Note that observation of a toner particle cross-section and measurement of the matrix-domain structure are described later.

The average circularity of the toner particles is preferably 0.930 or more and 0.980 or less. When the average circularity of the toner particles is within the aforementioned range, the mechanical stress received from members such as the carrier is evenly applied and a decrease in transferability can be suppressed also after durable use. Note that a measurement method of the average circularity of the toner particles is described later.

<Description of Materials>

Materials that can be used to carry out the present invention are described below in detail.

<Binder Resin>

The binder resin of the present invention needs to contain the crystalline resin.

A publicly-known crystalline resin can be used as the crystalline resin. For example, such resins include a crystalline vinyl resin, crystalline polyester, crystalline polyurethane, and crystalline polyurea. In addition, the publicly-known crystalline resins also include ethylene copolymers such as an ethylene-vinyl acetate copolymer, an ethylene-methyl acrylate copolymer, an ethylene-ethyl acrylate copolymer, an ethylene-butyl acrylate copolymer, an ethylene-methyl methacrylate copolymer, an ethylene-methacrylic acid copolymer, and an ethylene-acrylic acid copolymer, and the like.

The crystalline vinyl resin and crystalline polyester are preferable from the viewpoint of low-temperature fusibility and the crystalline vinyl resin is particularly preferable.

The crystalline vinyl resin preferably has a first monomer unit expressed by the following formula (1). When the crystalline resin has the first monomer unit expressed by the following formula (1), the crystallinity of the crystalline material is increased, the hardness of the toner particles to external force is improved, the burying of the external additive is suppressed, and the transferability is improved.

(1)

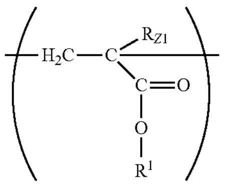

where $R_{Z1}$ represents a hydrogen atom or a methyl group and $R^1$ represents an alkyl group having 18 to 36 carbon atoms.

The first monomer unit expressed by the aforementioned formula (1) is derived from a first polymerizable monomer that is at least one selected from the group consisting of (meth)acrylic acid esters having an alkyl group with 18 to 36 carbon atoms. Since the crystalline resin including the first monomer unit expressed by the aforementioned formula (1) has a comb-shaped crystal structure, the crystal structure is strong. Thus, the burying of the external additive is more likely to be suppressed and the transferability is improved.

The (meth)acrylic acid esters having alkyl groups with 18 to 36 carbon atoms include, for example, (meth)acrylic acid esters having straight-chain alkyl groups with 18 to 36 carbon atoms [(meth)acrylic acid stearyl, (meth)acrylic acid nonadecyl, (meth)acrylic acid eicosyl, (meth)acrylic acid heneicosanyl, (meth)acrylic acid behenyl, (meth)acrylic acid lignoceryl, (meth)acrylic acid ceryl, (meth)acrylic acid octacosa, (meth)acrylic acid myricyl, (meth)acrylic acid dotriacontane, and the like] and (meth)acrylic acid esters having branched alkyl groups with 18 to 36 carbon atoms [(meth) acrylic acid 2-decyltetradecyl and the like].

Among these, the (meth)acrylic acid esters having straight-chain alkyl groups with 18 to 36 carbon atoms are preferable from the viewpoint of low-temperature fusibility. The (meth)acrylic acid esters having straight-chain alkyl groups with 18 to 30 carbon atoms are more preferable. At least one selected from the group consisting of straight-chain (meth)acrylic acid stearyl and (meth)acrylic acid behenyl are even more preferable. One type of the polymerizable monomer that generates the first monomer unit expressed by the aforementioned formula (1) may be used alone or two or more types of such monomers may be used in combination.

The proportion of the first monomer unit is preferably 30.0 mass % or more with respect to the total mass of all monomer units in the crystalline resin, more preferably, 50.0 mass % or more. Moreover, the proportion of the first monomer unit is preferably 95.0 mass % or less, more preferably 90 mass % or less.

The crystalline vinyl resin preferably contains a second monomer unit that is different from the first monomer unit and that is expressed by the following formula (2) or (3).

(2)

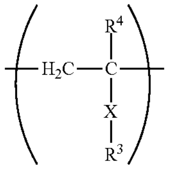

where

X is a single bond or an alkylene group having 1 to 6 carbon atoms, $R^3$ is a nitrile group, —C(═O)NHR$^{10}$ ($R^{10}$ is a hydrogen atom or an alkyl group having 1 to 4 carbon atoms, a hydroxy group, —COOR$^{31}$ ($R^{31}$ is a hydrogen atom, an alkyl group having 1 to 6 carbon atoms, or a hydroxy alkyl group having 1 to 6 carbon atoms), —NH—C(═O)—N($R^{33}$)$_2$ ($R^{33}$ are each independently a hydrogen atom or an alkyl group having 1 to 6 carbon atoms), —COO($CH_2$)$_2$NHCOOR$^{34}$ ($R^{34}$ is an alkyl group having 1 to 4 carbon atoms), or —COO($CH_2$)$_2$—NH—C(═O)—N($R^{35}$)$_2$ ($R^{35}$ are each independently a hydrogen atom or an alkyl group having 1 to 6 carbon atoms), and $R^4$ is a hydrogen atom or a methyl group.

(3)

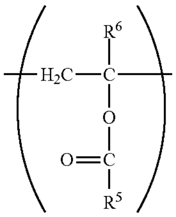

where $R^5$ is an alkyl group having 1 to 4 carbon atoms, and $R^6$ is a hydrogen atom or a methyl group.

When the crystalline resin includes the second monomer unit, a polarity difference with the first monomer unit is generated.

This polarity difference promotes crystallization of the first monomer unit. This improves the hardness of the toner particles to external force, suppresses the burying of the external additive, and improves the transferability. Specifically, the first monomer units are incorporated in the crystalline resin and gather to exhibit crystallinity. Normally, the crystallization of the first monomer unit is inhibited when another monomer unit is incorporated, and crystallinity as a crystalline resin is thus less likely to be exhibited. This tendency becomes significant when multiple types of monomer units are randomly bonded to one another in one molecule of the crystalline resin. However, when the crystalline resin includes the first monomer unit and the second monomer unit with different polarities, the first monomer unit and the second monomer unit are assumed to be capable of forming a clear phase separation state without compatibilization in the crystalline resin. The crystallinity can be thereby improved even when another monomer unit is incorporated, and thus the hardness of the toner to external force is improved, the burying of the external additive is suppressed, and the transferability is improved.

Specifically, for example, polymerizable monomers satisfying the aforementioned formula (2) among the polymerizable monomers described below can be used as the polymerizable monomer that generates the second monomer unit.

A monomer having a nitrile group; for example, acrylonitrile, methacrylonitrile, and the like.

A monomer having a hydroxy group; for example, (meth) acrylic acid-2-hydroxyethyl, (meth)acrylic acid-2-hydroxypropyl, and the like.

A monomer having an amide group; for example, acrylamide and a monomer obtained by reacting amine having 1 to 30 carbon atoms and a carboxylic acid (acrylic acid, methacrylic acid, and the like) having an ethylenically unsaturated bond and having 2 to 30 carbon atoms by a publicly-known method.

A monomer having an urea group: for example, a monomer obtained by reacting an amine having 3 to 22 carbon atoms [primary amine (normal-butylamine, t-butylamine, propylamine, isopropylamine, and the like), secondary amine (di-normal-ethylamine, di-normal-propylamine, di-normal-butylamine, and the like), aniline, cyclohexylamine, and the like] and isocyanate having an ethylenically unsaturated bond and 2 to 30 carbon atoms by a publicly-known method.

A monomer having a carboxy group; for example, methacrylic acid, acrylic acid, and (meth)acrylic acid-2-carboxyethyl.

Among these, the monomers having the nitrile group, the amide group, the hydroxy group, and the urea group are preferably used. A monomer having an ethylenically unsaturated bond and at least one functional group selected from the group consisting of the nitrile group, the amide group, the hydroxy group, and the urea group is more preferable. Acrylonitrile and methacrylonitrile are particularly preferable.

Vinyl esters such as vinyl acetate, vinyl propionate, vinyl butyrate, vinyl caproate, vinyl caprylate, vinyl caprinate, vinyl laurate, vinyl myristate, vinyl palmitate, vinyl stearate, vinyl pivalate, and vinyl octylate are also preferably used as the polymerizable monomer that generates the second monomer unit. Among these, the vinyl esters are unconjugated monomers and the reactivity with the first polymerizable monomer tends to be maintained at a suitable level. The crystallinity of the polymer can be thereby easily improved and the vinyl esters are thus preferable from the viewpoint of low-temperature fusibility.

The proportion of the second monomer unit is preferably 5.0 mass % or more and 40.0 mass % or less with respect to the total mass of all monomer units in the crystalline resin, more preferably, 10.0 mass % or more and 30.0 mass % or less.

The crystalline resin may contain a third monomer unit deriving from a third polymerizable monomer within a range in which the aforementioned mass ratios of the first monomer unit and the second monomer unit are not impaired.

For example, monomers described below can be used as the third polymerizable monomer.

Such monomers include styrenes such as styrene and o-methylstyrene, derivatives thereof, and (meth)acrylic acid esters such as, (meth)acrylic acid methyl, (meth)n-butyl acrylate, (meth)acrylic acid-t-butyl, and (meth)acrylic acid-2-ethylhexyl. Among these, the third polymerizable monomer is preferably styrene from the viewpoint of low-temperature fusibility.

The proportion of the third monomer unit is preferably 5.0 mass % or more and 50.0 mass % or less with respect to the total mass of all monomer units in the crystalline resin, more preferably, 10.0 mass % or more and 30.0 mass % or less.

<Amorphous Resin>

The binder resin may contain an amorphous resin. When the binder resin contains the amorphous resin, domains can be formed. Publicly-known amorphous resins can be used as the amorphous resin and the amorphous resin is preferably polyester, a styrene acrylic resin, or a hybrid resin of these resins from the viewpoint of low-temperature fusibility and a fusion separation property.

A styrene acrylic resin normally used in a toner can be preferably used as the styrene acrylic resin.

Styrene-based monomers include styrene, α-methylstyrene, β-methylstyrene, o-methylstyrene, m-methylstyrene, p-methylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, p-methoxystyrene, and p-phenylstyrene. One of these styrene-based monomers may be used alone, or two or more of these may be used in combination.

(Meth)acrylic monomers include methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-amyl (meth)acrylate, n-hexyl (meth)acrylate, 2-ethylhexyl (meth)acrylate, n-octyl (meth)acrylate, n-nonyl (meth)acrylate, cyclohexyl (meth) acrylate, benzil (meth)acrylate, dimethyl phosphate ethyl (meth)acrylate, diethyl phosphate ethyl (meth)acrylate, dibutyl phosphate ethyl (meth)acrylate and 2-benzoyloxyethyl (meth)acrylate, (meth)acrylonitrile, 2-hydroxyethyl (meth)acrylate, (meth)acrylic acid, and maleic acid. One of these (meth)acrylic monomers may be used alone, or two or more of these may be used in combination.

Polyester normally used in a toner can be preferably used as polyester. Monomers used for polyester include polyols (dihydric alcohol or alcohol with a valance of three or more), polyvalent carboxylic acids (dicarboxylic acid or carboxylic acid with a valance of three or more), anhydrides of these acids, and lower alkyl esters of these acids.

Polyols include the following substances.

Dihydric alcohols include the following bisphenol derivatives.

Such bisphenol derivatives include polyoxypropylene (2.2)-2,2-bis(4-hydroxyphenyl)propane, polyoxypropylene (3.3)-2,2-bis(4-hydroxyphenyl)propane, polyoxyethylene (2.0)-2,2-bis(4-hydroxyphenyl)propane, polyoxypropylene (2.0)-polyoxyethylene(2.0)-2,2-bis(4-hydroxyphenyl) propane, polyoxypropylene(6)-2,2-bis(4-hydroxyphenyl) propane, and the like.

Other polyols include ethylene glycol, diethylene glycol, triethylene glycol, 1,2-propanediol, 1,3-propanediol, 1,4-butanediol, neopentyl glycol, 1,4-butenediol, 1,5-pentanediol, 1,6-hexanediol, 1,4-cyclohexanedimethanol, dipropylene glycol, polyethylene glycol, polypropylene glycol, polytetramethylene glycol, sorbitol, 1,2,3,6-hexanetetrole, 1,4-sorbitan, pentaerythritol, dipentaerythritol, tripentaerythritol, 1,2,4-butanetriol, 1,2,5-pentanetriol, glycerin, 2-methylpropanetriol, 2-methyl-1,2,4-butanetriol, trimethylolethane, trimethylolpropane, and 1,3,5-trihydroxymethylbenzene.

One of these polyols may be used alone, or two or more of these may be used in combination.

Polyvalent carboxylic acids include the following substances.

Dicarboxylic acids include maleic acid, fumaric acid, citraconic acid, itaconic acid, glutaconic acid, phthalic acid, isophthalic acid, terephthalic acid, succinic acid, adipic acid, sebacic acid, azelaic acid, malonic acid, n-dodecenyl succinic acid, isododecenyl succinic acid, n-dodecyl succinic acid, isododecyl succinic acid, n-octenyl succinic acid, n-octyl succinic acid, isooctenyl succinic acid, isooctyl succinic acid, anhydrides of these acids, and lower alkyl esters of these acids. Among these, maleic acid, fumaric acid, terephthalic acid, and n-isododecenyl succinic acid are preferably used.

Carboxylic acids with a valance of three or more, anhydrides of these acids, and lower alkyl esters of these acids include the following substances.

The substances are 1,2,4-benzenetricarboxylic acid (trimellitic acid), 2,5,7-naphthalenetricarboxylic acid, 1,2,4-naphthalenetricarboxylic acid, 1,2,4-butanetricarboxylic acid, 1,2,5-hexanetricarboxylic acid, 1,3-dicarboxyl-2-methyl-2-methylenecarboxypropane, 1,2,4-cyclohexane tricarboxylic acid, tetra(methylenecarboxyl)methane, 1,2,7,8-octanetetracarboxylic acid, pyromellitic acid, Empol trimer acid, anhydrides of these acids, and lower alkyl esters of these acids. Among these, 1,2,4-benzenetricarboxylic acid (trimellitic acid) or derivatives such as acid anhydrides thereof are low in cost and reaction thereof can be controlled easily. Thus, such substances are preferably used.

These polyvalent carboxylic acids may be used alone, or two or more of these may be used in combination.

<Other Resins>

For the purpose of improving pigment dispersiveness and the like, the binder resin may contain resins other than the crystalline resin and the amorphous resin by such an amount that the effects of the present invention is not impaired.

Such resins include the following resins.

The resins are polyvinyl chloride, a phenolic resin, a natural resin-modified phenol resin, a natural resin-modified maleic acid resin, polyvinyl acetate, a silicone resin, polyester, polyurethane, polyamide, a furan resin, an epoxy resin, a xylene resin, polyvinyl butyral, a terpene resin, a coumarone-indene resin, and a petroleum-based resin.

<Organic Silicon Polymer Particles>

Although a method of producing the organic silicon polymer particles to be used in the present invention is not limited to a particular method, the particles are preferably formed through hydrolysis of a silane monomer by a sol-gel process and condensation polymerization. Specifically, a mixture of a bifunctional monomer (S2) having two siloxane bonds, a trifunctional monomer (S3) having three siloxane bonds, and tetrafunctional monomer (S4) having four siloxane bonds is hydrolyzed and subjected to condensation polymerization to be polymerized and the particles are thereby formed. In the production method, the present inventors produced the organic silicon polymer particles that exhibit the aforementioned effects by adjusting the mixing ratio of the aforementioned monomers, hydrolysis, and solvent temperature, type of catalyst, agitation time, pH of a solution, and the like in a condensation reaction.

The monomers used in the present invention can be selected as appropriate depending on compatibility with the solvent and the catalyst, a hydrolysis property, and the like and tetraethoxysilane is preferable as the tetrafunctional monomer. Moreover, trimethoxymethylsilane is preferable as the trifunctional monomer. Furthermore, dimethyldimethoxysilane is preferable as the bifunctional monomer.

(S2)

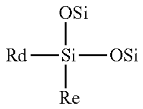

(S3)

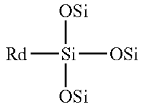

-continued (S4)

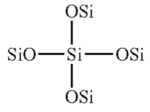

where Rd and Re are each an alkyl group having 1 to 6 carbon atoms.

The number-average diameter of primary particles of the organic silicon polymer particles is preferably 20 nm or more and 300 nm or less. When the number-average diameter of the primary particles is within the aforementioned range, it is possible to uniformly coat the toner particles with the organic silicon polymer particles that are the external additive and to also preferably suppress desorption. Moreover, since stress on the toner particles can be suppressed, transferability after durable use is improved.

The number-average diameter of the primary particles of the organic silicon polymer particles is more preferably 50 nm or more and 250 nm or less, even more preferably 80 nm or more and 180 nm or less from the viewpoint described above.

The content of the organic silicon polymer particles is preferably 0.5 parts by mass or more and 20.0 parts by mass or less with respect to 100.0 parts by mass of the toner particles. When the content of the organic silicon polymer particles is within the aforementioned range, the coverage of the organic silicon polymer particles is appropriate with respect to a sufficient amount of toner and the effect of reducing stress in durable use is thus obtained. Moreover, transmission of heat to a main body is less likely to be inhibited.

When a total peak area derived from an organic silicon polymer in a chart obtained in $^{29}$Si-NMR measurement is represented by SA, a peak area derived from a $SiO_{4/2}$ unit structure (derived from a Q unit structure) is represented by S4, a peak area derived from a $SiO_{3/2}$ unit structure (derived from a T unit structure) is represented by S3, and a peak area derived from a $SiO_{2/2}$ unit structure (derived from a D unit structure) is represented by S2, the organic silicon polymer particles of the present invention preferably satisfies $$0.20 \leq S4/SA \leq 0.60$$

$$0.00 \leq S3/SA \leq 0.50$$

$$0.20 \leq S2/SA \leq 0.70.$$

When the peak areas are within the aforementioned ranges, it is possible to suppress the burying of the external additive particles into the toner particle surfaces and breakage of the external additive particles itself in the case where the toner particles receive stress from members such as the carrier. Moreover, when the organic silicon polymer particles satisfies $$0.30 \leq S4/SA \leq 0.50$$

$$0.00 \leq S3/SA \leq 0.10$$

$$0.50 \leq S2/SA \leq 0.70.$$

A presence amount ratio of the Si—O—C bond and the siloxane bond (Si—O—Si) inside the external additive particles becomes optimal and this is more preferable from the viewpoint of durable use stability of the toner. Note that the measurement method of presence amount ratio in the organic silicon polymer particles by $^{29}$Si-NMR is described later.

The surfaces of the organic silicon polymer particles are preferably subjected to surface treatment with a hydrophobing agent. The hydrophobing agent is not limited to a particular agent but is preferably an organic silicon compound. For example, such compounds include alkyl silazane compounds such as hexamethyldisilazane, alkyl alkoxysilane-based compounds such as diethyldiethoxysilane, trimethylmethoxysilane, methyltrimethoxysilane, butyltrimethoxysilane, and octamethylcyclotetrasiloxane, chlorosilane-based compounds such as dimethyldichlorosilane and trimethylchlorosilane, a silicone oil, a silicone varnish, and the like. The hydrophobing treatment of the external additive particle surfaces suppresses aggregation of the particles of the external additive, allows even coating of the toner particles, and further improves the transferability after durable use. The external additive is preferably treated with at least one compound selected from the group consisting of alkyl silazane, alkyl alkoxysilane, chlorosilane, and the silicone oil among the aforementioned compounds. Moreover, the treatment using the alkyl silazane is more preferable from the viewpoint of transferability after durable use.

<Inorganic Fine Particles>

The toner of the present invention may contain inorganic fine particles as necessary.

The inorganic fine particles may be internally added to the toner particles or externally added to the toner particles as an external additive other than the organic silicon polymer particles. The inorganic fine particles include fine particles such as silica fine particles, titanium oxide fine particles, alumina fine particles, and multiple-oxide fine particles of these substances. The silica fine particles and the titanium oxide fine particles among these inorganic fine particles are preferable for improvement of flowability and even charging.

The inorganic fine particles are preferably hydrophobized by a silane compound, a silicone oil, or a mixture thereof.

The specific surface area of the inorganic fine particles as the external additive is preferably 50 $m^2/g$ or more and 400 $m^2/g$ or less from the viewpoint of improving the flowability. Moreover, the specific surface area of the inorganic fine particles as the external additive is preferably 10 $m^2/g$ or more and 50 $m^2/g$ or less from the viewpoint of improving durable use stability. The inorganic particles may be used together to achieve both of the improvement in flowability and the durable use stability.

The content of the external additive other than the organic silicon polymer particles is preferably 0.1 parts by mass or more and 10.0 parts by mass or less with respect to 100 parts by mass of the toner particle. Mixing of the toner particle and the external additive can be performed by using a publicly-known mixer such as a Henschel mixer.

<Release Agent>

The toner particles may contain a release agent, and a release agent optimal in combination with the crystalline resin is selected. In the toner of the present invention, the release agent is assumed to move to the surfaces of the toner particles through the crystalline resin in fusing. Accordingly, a release agent having a melting point higher than the melting point Tp of the crystalline resin is preferable. The release agent includes the following agent.

Such agents are hydrocarbon-based waxes such as a microcrystalline wax, a paraffin wax, and a Fischer-Tropsch wax; oxides of hydrocarbon-based waxes such as a polyethylene oxide wax or block copolymer thereof; waxes that have fatty acid esters as main components such as carnauba wax; and waxes in which fatty acid esters are partially or entirely deacidified such as a deacidified carnauba wax.

Such agents further include agents as follows: saturated straight chain fatty acids such as palmitic acid, stearic acid, and montanic acid; unsaturated fatty acids such as brassidic acid, eleostearic acid, and parinaric acid; saturated alcohols such as stearyl alcohol, aralkyl alcohol, behenyl alcohol, carnaubyl alcohol, ceryl alcohol, and myricyl alcohol; polyols such as sorbitol; esters of fatty acids such as palmitic acid, stearic acid, behenic acid, and montanic acid and alcohols such as stearyl alcohol, aralkyl alcohol, behenyl alcohol, carnaubyl alcohol, ceryl alcohol, and myricyl alcohol; fatty acid amides such as linoleamide, oleamide, and lauramide; saturated fatty acid bisamides such as methylenebisstearamide, ethylenebiscapramide, ethylenebislauramide, hexamethylenebisstearamide; unsaturated fatty-acid amides such as ethylenebisoleamide, hexamethylenebisoleamide, N,N'-dioleyladipamide, and N,N'-dioleylsebacamide; aromatic bisamides such as m-xylylenebisstearamide, N,N'-distearylisophthalamide; aliphatic metal salts (substances generally referred to as metallic soap) such as calcium stearate, calcium laurate, zinc stearate, and magnesium stearate; waxes obtained by grafting an aliphatic hydrocarbon-based wax by using a vinyl-based monomer such as styrene and acrylic acid; partially-esterified substances of polyol and fatty acid such as behenic acid monoglyceride; and methyl ester compounds having a hydroxy group obtained by hydrogenating vegetal oil.

The content of the release agent is preferably 2.0 parts by mass or more and 30.0 parts by mass or less with respect to 100 parts by mass of the binder resin.

<Colorant>

The toner particles may contain a colorant as necessary. Such colorants include the following substances.

Black colorants include carbon black; and a colorant toned to black by using a yellow colorant, a magenta colorant, and a cyan colorant. Although a pigment may be used alone in the colorant, using a dye and a pigment in combination to improve color definition is preferable from the viewpoint of image quality of a full-color image.

Pigments for magenta toners include the following: C.I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48:2, 48:3, 48:4, 49, 50, 51, 52, 53, 54, 55, 57:1, 58, 60, 63, 64, 68, 81:1, 83, 87, 88, 89, 90, 112, 114, 122, 123, 146, 147, 150, 163, 184, 202, 206, 207, 209, 238, 269, and 282; C.I. Pigment Violet 19; and C.I. Vat Red 1, 2, 10, 13, 15, 23, 29, and 35.

Dyes for magenta toners include the following: oil-soluble dyes such as C.I. Solvent Red 1, 3, 8, 23, 24, 25, 27, 30, 49, 81, 82, 83, 84, 100, 109, and 121; C.I. Disperse Red 9; C.I. Solvent Violet 8, 13, 14, 21, and 27; and C.I. Disperse Violet 1, and basic dyes such as C.I. Basic Red 1, 2, 9, 12, 13, 14, 15, 17, 18, 22, 23, 24, 27, 29, 32, 34, 35, 36, 37, 38, 39, and 40; and C.I. Basic Violet 1, 3, 7, 10, 14, 15, 21, 25, 26, 27, and 28.

Pigments for cyan toners include the following: C.I. Pigment Blue 2, 3, 15:2, 15:3, 15:4, 16, and 17; C.I. Vat Blue 6; C.I. Acid Blue 45, and copper phthalocyanine pigments in which 1 to 5 phthalimidemethyl groups are substituted in a phthalocyanine skeleton.

Dyes for cyan toners include C.I. Solvent Blue 70.

Pigments for yellow toners include the following: C.I. Pigment Yellow 1, 2, 3, 4, 5, 6, 7, 10, 11, 12, 13, 14, 15, 16, 17, 23, 62, 65, 73, 74, 83, 93, 94, 95, 97, 109, 110, 111, 120, 127, 128, 129, 147, 151, 154, 155, 168, 174, 175, 176, 180, 181, and 185; and C.I. Vat Yellow 1, 3, and 20.

Dyes for yellow toners include C.I. Solvent Yellow 162.

These colorants may be used alone or in a mixture, or further in the state of a solid solution. The colorant may be selected from the viewpoints of hue angle, saturation, intensity, lightfastness, OHP transparency, and dispersibility into a toner.

The content of the colorant is preferably 0.1 parts by mass or more and 30.0 parts by mass or less with respect to 100 parts by mass of binder resin.

<Charge Control Agent>

The toner particles may contain a charge control agent as necessary. Blending the charge control agent can stabilize charge properties and enable control to an optimal frictional charge amount depending on a development system.

A publicly-known charge control agent can be used as the charge control agent. A metal compound of an aromatic carboxylic acid that has no color and that has high charging speed of the toner and can stability maintain a fixed charging amount is particularly preferable.

Negative charge control agents include salicylic acid metal compounds, naphthoic acid metal compounds, dicarboxylic acid metal compounds, polymer compounds having a sulfonic acid or a carboxylic acid in a side chain, polymer compounds having a sulfonate or an esterified sulfonic acid in a side chain, polymer compounds having a carboxylate or an esterified carboxylic acid in a side chain, boron compounds, urea compounds, silicon compounds, and calixarenes.

The charge control agent may be internally or externally added to the toner particles. In the case of internal addition, the content of the charge control agent is preferably 0.2 parts by mass or more and 10.0 parts by mass or less with respect to 100 parts by mass of binder resin, more preferably 0.5 parts by mass or more and 10.0 parts by mass or less.

<Developer>

Although the toner of the present invention can be used as a one-component developer, the toner is preferably mixed with a magnetic carrier to be used as a two-component developer from the viewpoint of obtaining stable images for a long period.

As the magnetic carrier, it is possible to use publicly-known carriers including, for example, iron powder whose surface is oxidized, unoxidized iron powder, particles of metals such as iron, lithium, calcium, magnesium, nickel, copper, zinc, cobalt, manganese, and rare earths, alloy particles of these metals, oxidized particles, magnetic materials such as ferrite, a magnetic material dispersed resin carrier (so-called resin carrier) containing a magnetic martial and a binder resin that holds the magnetic material in a dispersed state, and the like.

When the toner of the present invention is mixed with the magnetic carrier to be used as the two-component developer, a mixing ratio of the toner and the carrier is preferably such that the toner concentration is 2.0 mass % or more and 15.0 mass % or less, more preferably 4.0 mass % or more and 13.0 mass % or less.

<Production Method of Toner>

Although a production method of the toner of the present invention is not limited to a particular method, a production method suitable for producing the toner of the present invention is described in detail.

The production method suitable for producing the toner of the present invention includes a kneading-pulverizing method. The kneading-pulverizing method is a production method of the toner including a melting and kneading step in which toner compositions containing the binder resin, the release agent, and the like are melted and knead to obtain a melted and kneaded product and a pulverizing step in which the melted and kneaded product is cooled and solidified and the cooled and solidified product is pulverized to obtain a pulverized product.

In the aforementioned production method, melting and kneading a mixture in which the proportions of the crystalline resin and the amorphous resin are controlled allows the toner to have a matrix-domain structure formed of a matrix containing the crystalline resin and a domain containing the amorphous resin.

A toner production procedure in the melt-kneading-pulverizing method is described below.

<Raw Material Mixing Step>

In a raw material mixing step, the binder resin, a wax, a colorant, and other components such as a charge control agent as necessary, for example, are weighed in predetermined amounts, blended, and mixed, as materials forming the toner particles. Examples of the mixing apparatus include a double cone mixer, a V-type mixer, a drum-type mixer, a super mixer, a Henschel mixer, a Nauta mixer, Mechano Hybrid (manufactured by Nippon Coke & Engineering Co., Ltd.), and the like.

<Melting and Kneading Step>

Next, the materials thus mixed are melted and kneaded to disperse the wax and the like into the binder resin. In the melting and kneading step, a batch-type kneader such as a pressure kneader or a Banbury mixer, or a continuous kneader can be used, and a single-screw or twin-screw extruder is mainly used because of their advantages of continuous manufacturing. The single-screw or twin-screw extruders include, for example, a KTK-type twin-screw extruder (manufactured by Kobe Steel, Ltd.), a TEM-type twin-screw extruder (manufactured by Toshiba Machine Co., Ltd.), a PCM kneader (manufactured by Ikegai Corporation), a twin-screw extruder (manufactured by K.C.K. Corporation), a co-kneader (manufactured by Buss AG), KNEADEX (manufactured by Nippon Coke & Engineering Co., Ltd.), and the like. Furthermore, a resin composition obtained by the melting and kneading may be rolled by a twin roll or the like, and cooled by water or the like in a cooling step.

Methods of this step include a method in which the resin composition is rolled with a two-axis roller or drum and then cooled with a steel belt cooler (manufactured by Nippon Steel Conveyor Co., Ltd.) or a method in which the resin composition is rolled while being cooled with a press roller and a drum including a cooling mechanism in an interior like a belt drum flaker (manufactured by Nippon Coke & Engineering Co., Ltd.).

The dispersed states of the crystalline resin and the amorphous resin, the number-average diameter of the domain, and the like can be controlled by controlling the kneading temperature, the rotation speed of the screw, and the like in the melting and kneading step.

<Pulverizing Step>

Then, the cooled product of the resin composition is pulverized to have a desired particle diameter in a pulverizing step. In the pulverizing step, the cooled product is coarsely pulverized by, for example, a pulverizer such as a crusher, a hammer mill or a feather mill, and is then further finely pulverized by, for example, Kryptron System (manufactured by Kawasaki Heavy Industries, Ltd.), Super Rotor (manufactured by Nisshin Engineering Inc.), Turbo Mill (manufactured by Turbo Kogyo Co., Ltd.), or a fine pulverizer of an air jet system.

<Classifying Step>

Thereafter, classification is performed as necessary using a classifier or a sieving machine such as Elbow-Jet (manufactured by Nittetsu Mining Co., Ltd.) of an inertial classification system, Turboplex (manufactured by Hosokawa Micron Corporation) of a centrifugal classification system, TSP separator (manufactured by Hosokawa Micron Corporation), or Faculty (manufactured by Hosokawa Micron Corporation).

[Externally Adding Step]

Furthermore, a process of externally adding the external additive to the surfaces of the toner particles is performed. The method for externally adding an external additive includes a method that weighs the classified toner particles, the organic silicon polymer particles, and various types of publicly-known external additives in predetermined amounts, followed by agitating and mixing using a mixing apparatus such as a double cone mixer, a V-type mixer, a drum-type mixer, a super mixer, a Henschel mixer, a Nauta mixer, Mechano Hybrid (manufactured by Nippon Coke & Engineering Co., Ltd.), or Nobilta (manufactured by Hosokawa Micron Corporation) as an external addition machine.

Measurement methods of various physical properties relating to the toner of the present invention are described below.

<Observation of Cross-Section of Toner Particle and Measurement of Matrix-Domain Structure>

First, thin pieces to be standard samples for abundance are fabricated.

The crystalline resin is sufficiently dispersed in a visible light curable resin (ARONIX LCR series D800) and then the resin is irradiated with short-wavelength light to be cured. An obtained cured product is cut with an ultramicrotome including a diamond knife to fabricate a thin-piece sample of 250 nm. A thin-piece sample of the amorphous resin is also fabricated in a similar manner.

Moreover, the crystalline resin and the amorphous resin are mixed at ratios of 0/100, 30/70, 70/30, and 0/100 based on mass and are melted and kneaded to fabricate kneaded products. Each of these products is similarly dispersed in the visible light curable resin, the resin is cured, and then the cured product is cut to prepare a thin-piece sample.

Next, a cross-section of each of the cut standard samples is observed by using a transmission electron microscope (electron microscope JEM-2800 manufactured by JEOL Ltd.) (TEM-EDX) and element mapping is performed by using EDX. Elements to be mapped are carbon, oxygen, and nitrogen. Mapping conditions are as follows.

Acceleration voltage: 200 kV

Electron ray irradiation size: 1.5 nm

Live time limit: 600 sec

Dead time: 20 to 30 sec

Mapping resolution: 256×256

Based on a spectrum intensity (average in an area of a 10 nm square) of each element, (oxygen element intensity/carbon element intensity) and (nitrogen element intensity/carbon element intensity) are calculated and a calibration curve for the mass ratio of the crystalline resin and the amorphous resin is created. When the monomer unit of the crystalline resin includes a nitrogen atom, the quantitative determination hereinafter is performed by using the calibration curve of (nitrogen element intensity/carbon element intensity).

Next, toner samples are analyzed.

Each toner is sufficiently dispersed in a visible light curable resin (ARONIX LCR series D800) and then the resin is irradiated with short-wavelength light to be cured. An obtained cured product is cut with an ultramicrotome including a diamond knife to fabricate a thin-piece sample of 250 nm.

Next, the cut sample is observed by using a transmission electron microscope (electron microscope JEM-2800 manufactured by JEOL Ltd.) (TEM-EDX). Cross-sectional images of the toner particles are obtained and element mapping is performed by using EDX. Elements to be mapped are carbon, oxygen, and nitrogen.

Note that the toner particle cross sections to be observed are selected as follows. First, a cross-sectional area of each toner particle is obtained from the toner particle cross-sectional image and a diameter (equivalent circle diameter) of a circle having the same area as the obtained cross-sectional area is obtained. Only the toner particle cross-sectional image in which an absolute value of a difference between the obtained equivalent circle diameter and the weight-average particle diameter (D4) of the toner is 1.0 μm or less is observed.

For domains confirmed from the observed images, (oxygen element intensity/carbon element intensity) and/or (nitrogen element intensity/carbon element intensity) are calculated based on a spectrum intensity (average in an area of a 10 nm square) of each element and are compared with the aforementioned calibration curve to calculate the ratio of the crystalline resin and the amorphous resin. A domain in which the proportion of the amorphous resin is 80% or more is referred to as the "domain of amorphous resin" in the present disclosure.

After the domains confirmed from the observed image are specified, the particle diameter of each domain present in the toner particle cross-sectional image is obtained by a binarization process. The particle diameter is assumed to be a major axis of the domain. The domain particle diameter is measured at ten points per one toner particle and an arithmetic average value of the domain particle diameters in ten toner particles is set as the number-average diameter (μm) of the domains.

Note that Image Pro PLUS (manufactured by Nippon Roper K.K) is used for the binarization process and the calculation of the number-average diameter.

<Method of Separating Each Material from Toner>

It is possible to separate each material from the toner by utilizing a difference in solubility among the materials contained in the toner into solvents.

First separation: The toner is dissolved into methyl ethyl ketone (MEK) having a temperature of 23° C. to separate a soluble (the amorphous resin) and insolubles (the crystalline resin, the wax, the colorant, the external additive, and the like).

Second separation: The insolubles (the crystalline resin, the wax, the colorant, the external additive, and the like) obtained in the first separation are dissolved into MEK having a temperature of at 100° C. to separate solubles (the crystalline resin and the wax) and insolubles (the colorant, the external additive, and the like).

Third separation: The solubles (the crystalline resin and the wax) obtained in the second separation are dissolved into chloroform having a temperature of 23° C. to separate a soluble (the crystalline resin) and an insoluble (the wax).

<Separation of External Additive and Toner Particles>

Into 100 mL of ion-exchanged water, 200 g of sucrose (manufactured by Kishida Chemicals Co., Ltd.) is added and is dissolved while being double-boiled to prepare a sucrose-concentrated liquid. Then, 31 g of the sucrose-concentrated liquid and 6 mL of Contaminon N (a 10 mass % aqueous solution of a neutral detergent for cleaning precision measurement devices having pH of 7 and including a non-ionic surfactant, an anionic surfactant, and an organic builder, manufactured by Wako Pure Chemical Corporation) are put into a tube for centrifugal separation to fabricate a dispersion liquid. Into this dispersion liquid, 1 g of toner is added and an aggregation of the toner is loosened with a spatula or the like.

The tube for centrifugal separation is shaken with a shaker ("KM Shaker" (model: V.SX) manufactured by Iwaki Co., Ltd.) for 20 minutes in a condition of 350 reciprocations per minute. After the shaking, the solution is put into a glass tube (50 mL) for a swing rotor and is subjected to centrifugal separation with a centrifugal separator in conditions of 3,500 rpm and 30 minutes.

In the glass tube after the centrifugal separation, the toner particles are present in a top layer and the external additive particles (the organic silicon polymer, the inorganic fine particles, and the like) are present in a lower layer on the aqueous solution side. The aqueous solution in the lower layer is collected and subjected to centrifugal separation to separate sucrose and the external additive particles from each other and collect the external additive. The centrifugal separation may be performed repeatedly as necessary. When multiple types of external additives are added, the external additives may be separated from one another by adjusting the conditions of the centrifugal separation.

(Measurement of Contents of Crystalline Resin and Amorphous Resin in Binder Resin in Toner)

The masses of the soluble and the insoluble obtained in the separation in each of the separation steps are measured to calculate the contents of the crystalline resin and the amorphous resin in the binder resin in the toner.

<Identification of Monomer Units Forming First, Second, and Third Resins and Measurement Method of Content Proportions Thereof>

Identification of the monomer units forming the first, second, and third resins and measurement of the content proportions thereof are performed by $^1$H-NMR under the following conditions.

Measurement apparatus: FT NMR apparatus JNM-EX400 (manufactured by JEOL Ltd.)
Measurement frequency: 400 MHz
Pulse condition: 5.0 μs
Frequency range: 10500 Hz
Cumulative number: 64 times
Measurement temperature: 30° C.
Specimen: 50 mg of measurement specimen is put in a sample tube with an inner diameter of 5 mm, deuterated chloroform ($CDCl_3$) is added as a solvent, the measurement specimen is dissolved in a constant-temperature bath at 40° C., and the specimen is prepared.

In the obtained $^1$H-NMR chart, a peak, among peaks belonging to the constituent elements of the first monomer unit, that is independent from peaks belonging to the constituent elements of the other monomer units is selected and an integral value S1 of this peak is calculated.

Similarly, a peak, among peaks belonging to the constituent elements of the second monomer unit, that is independent from peaks belonging to the constituent elements of the other monomer units is selected and an integral value S2 of this peak is calculated.

Moreover, when the binder resin includes the third monomer unit, a peak, among peaks belonging to the constituent elements of the third monomer unit, that is independent from peaks belonging to the constituent elements of the other monomer units is selected and an integral value S3 of this peak is calculated.

The content proportion of the first monomer unit is obtained as described below by using the aforementioned integral values S1, S2, and S3. Note that n1, n2, and n3 are the numbers of hydrogen in the constituent elements to which the peaks focused for the respective portions belong.

$$\text{Content proportion of first monomer unit (mol \%)}=\{(S1/n1)/((S1/n1)+(S2/n2)+(S3/n3))\}\times 100$$

Similarly, the content proportions of the second monomer unit and the third monomer unit are obtained as follows.

$$\text{Content proportion of second monomer unit (mol \%)}=\{(S2/n2)/((S1/n1)+(S2/n2)+(S3/n3))\}\times 100$$

$$\text{Content proportion of third monomer unit (mol \%)}=\{(S3/n3)/((S1/n1)+(S2/n2)+(S3/n3))\}\times 100$$

Note that, for example, when a polymerizable monomer that contents no hydrogen atom in the constituent elements except for the vinyl group is used in the first, second, and third resins, the measurement is performed by using $^{13}$C-NMR in a single pulse mode with the measured nucleus set to 13 C and the calculation is performed as in $^1$H-NMR.

Conversion from mol % to mass % can be performed based on the molecular weights of the monomer units.

<Measurement Method of Melting Points of Toner, Resins, and Like, Endothermic Peaks, and Absorbed Heat Amounts>

Melting points of the toner, the resins, and the like, endothermic peaks, and absorbed heat amounts are measured by using DSC Q1000 (manufactured by TA Instruments) in the following conditions.

Temperature increase: 10° C./min
Measurement start temperature: 20° C.
Measurement completion temperature: 180° C.
Temperature correction of an apparatus detector is performed by using melting points of indium and zinc and correction of heat amount is performed by using heat of fusion of indium.

Specifically, about 5 mg of specimen is accurately weighed and put into an aluminum pan to perform differential scanning calorimetry. An empty silver pan is used as a reference.

The peak temperature of the maximum endothermic peak in a first temperature increase process is referred to as the melting point.

Note that the maximum endothermic peak is a peak at which an absorbed heat amount is the greatest in the case where there are multiple peaks. Moreover, the absorbed heat amount at the maximum endothermic peak is obtained.

Note that a tetrahydrofuran (THF) insoluble from which the inorganic components of the toner are removed may be prepared as described later.

<Measurement Method of Softening Point (Tm) of Resin>

Measurement of the softening point of the resin is performed by using a constant-load extrusion type capillary rheometer "flowability evaluation apparatus Flowtester CFT-500D" (manufactured by Shimadzu Corporation) according to a manual attached to the apparatus. In this apparatus, a measurement specimen filled in a cylinder is heated and melted while being applied with a constant load with a piston from above the measurement specimen and the melted measurement specimen is extruded from a die in a bottom portion of the cylinder. A flow curve indicating a relationship between a piston lowering amount and a temperature in this case can be obtained.

Moreover, "melting temperature in the ½ method" described in the manual attached to the "flowability evaluation apparatus Flowtester CFT-500D" is referred to as the softening point. Note that the melting temperature in the ½ method is a temperature calculated as follows.

First, ½ of a difference between the piston lowering amount (flow-out completion point, referred to as Smax) at the completion of flow-out and the piston lowering amount (minimum point, referred to as Smin) at start of the flow-out is obtained (result is referred to as X. X=(Smax−Smin/2). A temperature on the flow curve at the point where the piston lowering amount becomes the sum of X and Smin is the melting temperature in the ½ method.

About 1.0 g of the resin is compression molded with a tablet molding compression machine (for example, NT-100H manufactured by NPa System Co., Ltd.) in an environment of 25° C. at about 10 MPa for about 60 seconds to be formed into a cylindrical product with a diameter of about 8 mm and this product is used as the measurement specimen.

Specific operations in the measurement are performed according the manual attached to the apparatus.

The measurement conditions of CFT-500D are as follows.

Test mode: heating method
Start temperature: 50° C.
Reached Temperature: 200° C.
Measurement interval: 1.0° C.
Heating rate: 4.0° C./min
Piston cross-sectional area: 1.000 $cm^2$
Test load (piston load): 10.0 kgf (0.9807 MPa)
Preheating time: 300 seconds
Diameter of hole of die: 1.0 mm
Length of die: 1.0 mm <Measurement Method of Weight-Average Particle Diameter (D4) of Toner (Particles)>

A precision particle diameter distribution measurement apparatus "Coulter Counter Multisizer 3" (registered trademark, manufactured by Beckman Coulter Inc.) that includes a 100 μm aperture tube and that uses an aperture electric resistance method and dedicated software "Beckman Coulter Multisizer 3 Version 3.51" (manufactured by Beckman Coulter Inc.) that is attached to the apparatus and that is used to set measurement conditions and analyze measurement data are used to measure the weight-average particle diameter (D4) of the toner (particles) with the number of effective measurement channels being 25,000, to analyze the measurement data, and to perform calculation.

A solution in which special grade sodium chloride is dissolved into ion-exchanged water at a concentration of about 1 mass %, for example, "ISOTON II" (manufactured by Beckman Coulter Inc.) can be used as an electrolyte aqueous solution used for the measurement.

Note that setting of the dedicated software is performed as described below before the measurement and the analysis are performed.

In a "screen of changing standard operating method (SOM)" of the dedicated software, the number of total count in a control mode is set to 50,000 particles, the number of measurement runs is set to 1, and a Kd value is set to a value obtained by using "standard particle 10.0 μm" (manufactured by Beckman Coulter Inc.). Pressing a button of measure threshold/noise level causes a threshold and a noise level to be automatically set. Moreover, a current is set to 1600 μA, a gain is set to 2, an electrolyte solution is set to ISOTON II, and a box of flush aperture tube after measurement is checked.

In a "convert pulses to size setting screen" of the dedicated software, bin spacing is set to log diameter, size bins is set to 256 size bins, and size range is set to 2 μm or more and 60 μm or less.

A specific measurement method is as follows.

(1) About 200 mL of the electrolyte aqueous solution is put in a 250 mL glass round-bottom beaker dedicated to Multisizer 3, the beaker is set in a sample stand, and agitation with stirrer rod is performed counterclockwise at 24 revolutions per second. Dirt and air bubbles in the aperture tube are removed by the "flush aperture tube" function of the dedicated software.

(2) About 30 mL of the electrolyte aqueous solution is put in a 100 mL glass flat-bottom beaker and about 0.3 ml of a diluted solution obtained by diluting Contaminon N (a 10 mass % aqueous solution of a neutral detergent for cleaning precision measurement devices having pH of 7 and including a non-ionic surfactant, an anionic surfactant, and an organic builder, manufactured by Wako Pure Chemical Corporation) three times (by mass) with ion-exchanged water is added to the electrolyte aqueous solution as a dispersant.

(3) A predetermined amount of ion exchange water is put into a water tank of an ultrasonic disperser "Ultrasonic Dispersion System Tetora 150" (manufactured by Nikkaki-bios) that incorporates two oscillators having an oscillation frequency of 50 kHz with phases thereof shifted from each other by 180 degrees and that has electric output of 120 W, and about 2 mL of Contaminon N is added into the water tank.

(4) The beaker of (2) is set in a beaker fixing hole of the ultrasonic disperser and the ultrasonic disperser is activated. Then, the height position of the beaker is adjusted such that a resonance condition of a liquid surface of the electrolyte aqueous solution in the beaker is maximized.

(5) About 10 mg of the toner (particles) is added to the electrolyte aqueous solution in the beaker of (4) little by little with the ultrasonic wave applied to the electrolyte aqueous solution, and is dispersed. Then, the ultrasonic dispersion process is continuously performed for another 60 seconds. Note that the water temperature of the water tank is appropriately adjusted to 10° C. or higher and 40° C. or lower in the ultrasonic dispersion.

(6) The electrolyte aqueous solution of (5) in which the toner (particles) is dispersed is dropped into the round-bottom beaker of (1) set in the sample stand by using a pipette and the measurement density is adjusted to about 5%. Then, measurement is performed until the number of measured particles reaches 50,000.

(7) The dedicated software attached to the apparatus analyzes the measurement data and calculates the weight-average particle diameter (D4). Note that "average size" in a screen of analysis/volume statistics (arithmetic average) in the case where graph/volume % is set in the dedicated software is the weight-average particle diameter (D4).

<Measurement of Average Circularity>

The average circularity of the toner is measured with a flow particle image analyzer "FPIA-3000" (manufactured by Sysmex Corporation) under measurement and analysis conditions in calibration work.

Specific measurement methods are as follows.

First, about 20 mL of ion-exchanged water from which solid impurities and the like have been removed in advance is put in a glass container. About 0.2 ml of a diluted solution obtained by diluting Contaminon N (a 10 mass % aqueous solution of a neutral detergent for cleaning precision measurement devices having pH of 7 and including a non-ionic surfactant, an anionic surfactant, and an organic builder, manufactured by Wako Pure Chemical Corporation) about three times (by mass) with ion-exchanged water is added to the ion-exchanged water in the glass container as a dispersant.

Then, about 0.02 g of the measurement specimen is added, a dispersion process is performed for two minutes by using an ultrasonic disperser, and the obtained product is used as a dispersion liquid for measurement. In this case, the dispersion liquid is cooled as necessary such that the temperature of the dispersion liquid is 10° C. or higher and 40° C. or lower. A desktop ultrasonic cleaner-disperser ("VS-150" (manufactured by Vlevo-Clear) with an oscillation frequency of 50 kHz and an electrical output of 150 W is used as the ultrasonic disperser. A predetermined amount of ion-exchanged water is put in a water tank of the ultrasonic disperser and about 2 mL of Contaminon N described above is added to the water tank.

The aforementioned flow particle image analyzer in which a standard objective lens (with a power of 10) is mounted is used for the measurement and particle sheath "PSE-900A" (manufactured by Sysmex Corporation) is used as a sheath fluid. The dispersion liquid adjusted according to the aforementioned procedure is introduced into the flow particle image analyzer and 3000 toner particles are measured in a total count mode in a HPF measurement mode.

Then, the average circularity of the toner particles is obtained with a binarization threshold in the particle analysis set to 85% and the analyzed particle diameter limited to 1.985 μm or more and less than 39.69 μm in equivalent circle diameter.

In the measurement, automatic focal adjustment is performed before measurement start by using standard latex particles ("RESEARCH AND TEST PARTICLES Latex Microsphere Suspensions 5200A" manufactured by Duke Scientific Corporation is diluted with ion-exchanged water). Thereafter, the focal adjustment is preferably performed every two hours after the measurement start.

Note that, in the examples, the flow particle image analyzer that was calibrated by Sysmex Corporation and for which a calibration certificate issued by Sysmex Corporation was issued was used. The measurement was performed under measurement and analysis conditions in the case where the calibration certificate was issued, except for the analyzed particle diameter being limited to 1.985 μm or more and less than 39.69 μm in equivalent circle diameter.

<Measurement Methods of Young's Moduli of Organic Silicon Polymer Particles and Toner>

The Young's modulus of each of the organic silicon polymer particles and the toner are obtained from a micro compression test performed at 25° C. by using Hysitron PI 85L PicoIndenter (manufactured by Bruker Corporation). The Young's modulus (MPa) is calculated from a slope of a profile (stress-strain curve) of displacement (nm) and test force (μN) obtained in the measurement.

Device, Jig

Base system: Hysitron PI-85L

Measurement indenter: flat-end indenter having a circular tip with a diameter of 1 μm Used SEM: Thermo Fisher Versa 3D SEM conditions: −10° tilt, 13 pA at 10 keV Measurement Conditions Measurement mode: displacement control Maximum displacement: 30 nm Displacement rate: 1 nm/sec Hold time: 2 seconds Unloading rate: 5 nm/sec Analysis Method Hertz analysis is applied to a curve obtained in compression from 0 nm to 10 nm in an obtained load displacement curve and the Young's modulus of each particle is calculated.

Sample Adjustment

Organic Silicon Polymer Particles: a product in which the organic silicon polymer particles are attached to a silicon wafer is used.

Toner: 0.1 g of the toner is weighed and is compression molded into a disc-shaped pellet with a diameter of 8.0 mm and a thickness of 1.5±0.3 mm by using a tablet molder in an environment of 25° C. and the pellet is used as a test piece.

[Method for Measuring XRD (X-Ray Diffraction)]

For XRD, a measuring apparatus "RINT-TTRII" (manufactured by Rigaku Corporation) and a control software and analysis software attached to the apparatus were used.

The measurement conditions were as follows:

X-ray: Cu/50 kV/300 mA

Goniometer: rotor horizontal goniometer (TTR-2)

Attachment: reference sample holder

Divergence slit: open

Divergence vertical limit slit: 10.00 mm

Scattering slit: open

Receiving slit: open

Counter: scintillation counter

Scanning mode: continuous

Scanning speed: 4.0000°/min.

Sampling width: 0.02000

Scanning axis: 2θ/θ

Scanning range: 10.0000° to 40.0000

Next, the toner is set on a test plate to start the measurement. The measurement is performed in a range of diffraction angle 2θ (2θ±0.20 deg) of 3 deg to 35 deg in CuKα property X-ray and a spectrum in which 2θ is 20.0 deg to 23.0 deg in the obtained spectrum is used as an index of crystallinity in the toner.

<Measurement Method of Abundance Ratio of Organic Silicon Polymer Particles by Solid-State $^{29}$Si-NMR>

In solid-state $^{29}$Si-NMR, peaks are detected in different shift regions depending on the structures of functional groups bonded to Si in constituent compounds of organic silicon polymer particles.

Each peak position can be used to identify the structure bonded to Si by performing identification using standard samples. Moreover, the abundance ratio of the constituent compounds can be calculated from obtained peak areas. Proportions of peak areas of a Q unit structure, a T unit structure, and a D unit structure with respect to the total peak area can be obtained by calculation.

Specific measurement conditions of solid-state $^{29}$Si-NMR are as follows.

Apparatus: JNM-ECX5002 (JEOL RESONANCE)

Temperature: room temperature

Measurement method: DDMAS method 29Si 45°

Test tube: zirconia 3.2 mm φ

Specimen: filled in the test tube in a powder state

Specimen rotation speed: 10 kHz

Relaxation delay: 180 s

Scan: 2000

After the measurement, multiple different silane components of substituents and linkage groups in the sample or the organic silicon polymer particles are subjected to peak resolution to be separated into peaks of the following M unit structure, D unit structure, T unit structure, and Q unit structure by curve fitting, and peak areas of the respective structures are calculated.

M unit structure:

(S1)

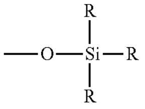

D unit structure:

(S2)

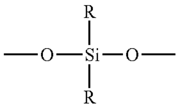

T unit structure:

(S3)

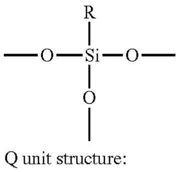

Q unit structure:

(S4)

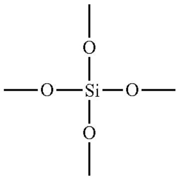

It is assumed that (S1+S2+S3+S4)=SA.

R in the formulae (S1), (S2), and (S3) represents a hydrocarbon group having 1 to 6 carbon atoms. Note that, when the structure needs to be checked in further detail, the identification may be performed by using measurement results of $^{1}$H-NMR in addition to the measurement results of $^{13}$C-NMR and $^{29}$Si-NMR described above.

S2/SA, S3/SA, and S4/SA are calculated from SA, S2, S3, and S4 obtained as described above.

EXAMPLES

Although the fundamental configurations and features of the present invention have been described above, the present invention will be specifically described based on Examples below. However, the present invention is not limited to these at all. Note that part is based on mass unless otherwise noted.

<Example of Production of Crystalline Resin C-1>

Solvent: Toluene 100.0 parts

Monomer composition 100.0 parts (The monomer composition was obtained by mixing behenyl acrylate, acrylonitrile, acrylic acid, and styrene described below in ratio described below.

Behenyl acrylate: 60.0 parts

Acrylonitrile: 10.0 parts

Styrene: 30.0 parts)

Polymerization initiator 0.5 parts

[t-butyl peroxypivalate (manufactured by NOF CORPORATION: Perbutyl PV)]

The above-described materials were loaded into a reaction vessel including a reflux cooling tube, an agitator, a thermometer, and a nitrogen introduction tube under a nitrogen atmosphere. The inside of the reaction vessel was heated to 70° C. while being agitated at 200 rpm to conduct a polymerization reaction for 12 hours, thereby obtaining a solution in which the polymer of the monomer composition was dissolved in toluene.

Subsequently, the solution was cooled down to 25° C., and thereafter, the solution was put into 1000.0 parts of methanol while being agitated to precipitate a methanol insoluble. The methanol insoluble thus obtained was separated by filtration, further washed with methanol, and thereafter, vacuum drying was conducted at 40° C. for 24 hours to obtain a crystalline resin 1. The melting point (Tp) of the crystalline resin 1 was 61° C.

<Example of Production of Crystalline Resins 2 to 10>

Crystalline resins 2 to 10 were obtained by performing reaction as in the example of production of the crystalline resin 1 except for changing the monomers and the parts by mass to those in Table 1.

TABLE 1

| | First monomer unit | | | Second monomer unit | | Third monomer unit | | |
|---|---|---|---|---|---|---|---|---|
| Crystalline resin No. | Raw material monomer | Parts | Number of carbon atoms in alkyl group $R_1$ in formula (1) | Raw material monomer | Parts | Raw material monomer | Parts | Tp [° C.] |
| 1 | BEA | 60.0 | 22 | AN | 10.0 | St | 30.0 | 61 |
| 2 | BEA | 100.0 | 22 | — | — | — | — | 61 |
| 3 | BEA | 32.0 | 22 | AN | 17.0 | St | 51.0 | 61 |
| 4 | BEA | 25.0 | 22 | AN | 18.5 | St | 56.5 | 61 |
| 5 | STA | 60.0 | 18 | AN | 10.0 | St | 30.0 | 55 |
| 6 | HA | 60.0 | 16 | AN | 10.0 | St | 30.0 | 48 |
| 7 | MYA | 60.0 | 30 | AN | 10.0 | St | 30.0 | 77 |
| 8 | BEA | 80.0 | 22 | AN | 5.0 | St | 15.0 | 61 |
| 9 | BEA | 50.0 | 22 | AN | 12.5 | St | 37.5 | 61 |
| 10 | HA | 100.0 | 16 | — | — | — | — | 48 |

Abbreviations in Table 1 are as follows:

BEA: behenyl acrylate

STA: stearyl acrylate

MYA: myricyl acrylate

HA: hexadecyl acrylate

AN: acrylonitrile

St: styrene

<Example of Production of Crystalline Resin 11>

1,12-dodecanediol: 46.5 parts

Dodecanedioic acid: 53.3 parts

Tin 2-ethylhexanoate: 0.5 parts

The above materials were weighed into a reaction tank equipped with a cooling tube, an agitator, a nitrogen introduction tube, and a thermocouple. The inside of the flask was replaced with nitrogen gas, and thereafter, the temperature was gradually increased while agitating, followed by reacting for 3 hours at a temperature of 140° C. while agitating.

Next, the pressure inside the reaction tank was reduced to 8.3 kPa, followed by reacting for 4 hours while the temperature was maintained at 200° C.

Thereafter, the pressure inside the reaction tank was reduced to 5 kPa or lower, followed by reacting for 3 hours at 200° C. to obtain a crystalline resin 11.

<Example of Production of Amorphous Resin 1>

An autoclave was charged with 50.0 parts of xylene, and after replacement with nitrogen, the temperature was increased to 185° C. in a sealed state under agitation.

To the autoclave, 80.7 parts of styrene, 17.8 parts of n-butyl acrylate, 1.1 parts of divinylbenzene, and 0.5 parts of acrylic acid, as well as a mixed solution of 1.5 parts of di-tert-butyl peroxide and 20.0 parts of xylene was dropped continuously for 3 hours be polymerized while the temperature in the autoclave was controlled at 185° C.

Furthermore, the mixture was maintained at the same temperature for 1 hour to complete polymerization, and the solvent was removed to obtain an amorphous resin 1. The softening point (Tm) of the amorphous resin 1 was 100° C.

<Example of Production of Amorphous Resin 2>

(Formula of Polyester Resin Components)

| | |
|---|---|
| Bisphenol A ethylene oxide (2.2 mol adduct) | 50.0 parts by mol |
| Bisphenol A propylene oxide (2.2 mol adduct) | 50.0 parts by mol |
| Terephthalic acid | 65.0 parts by mol |
| Trimellitic Anhydride | 25.0 parts by mol |
| Acrylic Acid | 10.0 parts by mol |

A four-neck flask was charged with 90 parts of a mixture of monomers that generate the aforementioned polyester resin components. A depressurization device, a water separation device, a nitrogen gas introduction device, a temperature measurement device, and an agitation device were attached to the flask and the mixture was agitated at 160° C. under a nitrogen atmosphere.

Into this mixture, 10 parts of a vinyl-based polymerizable monomer (81.0 parts of styrene, 17.0 parts of n-butyl acrylate, 0.9 parts of acrylic acid, and 1.1 parts of divinylbenzene) that generate a vinyl-based resin component and 1 part of benzoyl peroxide as a polymerization initiator were dropped from a dropping funnel in 4 hours and were made react for 5 hours at 160° C.

Then, the temperature was increased to 230° C., 0.2 parts of titanium tetrabutoxide with respect to the total amount of monomers generating the polyester resin components was added, and polymerization was performed until the softening point reached 115° C.

After the completion of reaction, the polymerized product was taken out from the container, cooled, and pulverized to obtain an amorphous resin 2.

<Example of Production of Toner Particle 1>

In this example of production, toner particles were produced by using an emulsion polymerization method. First, dispersion liquids were each produced in the method described below.

<Production of Crystalline Resin 1 Fine Particle Dispersion Liquid>

| | |
|---|---|
| Toluene (manufactured by Wako Pure Chemical Corporation) | 300 parts |
| Crystalline Resin 1 | 100 parts |

The aforementioned materials were weighed and mixed and were dissolved at 100° C.

Separately, 5.0 parts of sodium dodecylbenzenesulfonate and 10.0 parts of sodium laurate were added to 700 parts of ion-exchanged water and were heated and dissolved at 100° C. Next, the aforementioned toluene solution and the aforementioned aqueous solution were mixed and agitated at 7,000 rpm by using an ultra high speed agitation apparatus T.K. ROBOMIX (manufactured by Primix Corporation). Then, the mixture was emulsified at pressure of 200 MPa by using a high-pressure impact disperser Nano-Mizer (manufactured by Yoshida Kikai Co., Ltd.). Then, toluene was removed by using an evaporator and the concentration was adjusted by using ion-exchanged water to obtain a water-based dispersion liquid containing the crystalline resin 1 fine particles at a concentration of 20 mass % (crystalline resin 1 fine particle dispersion liquid).

The 50% particle diameter (D50) in terms of volume of the crystalline resin 1 was measured by using a dynamic light scattering particle size analyzer NANOTRAC UPA-EX150 (manufactured by Nikkiso Co., Ltd.) and was 0.40 μm.

<Production of Amorphous Resin 1 Fine Particle Dispersion Liquid>

| | |
|---|---|
| Tetrahydrofuran (manufactured by Wako Pure Chemical Corporation) | 300 parts |
| Amorphous resin 1 | 100 parts |
| Anionic surfactant NEOGEN RK (manufactured by DKS Co. Ltd.) | 0.5 parts |

The aforementioned materials were weighed and mixed and were dissolved.

Next, 20.0 parts of 1 mol/L ammonia water was added and the mixture was agitated at 4,000 rpm by using the ultra high speed agitation apparatus T.K. ROBOMIX (manufactured by Primix Corporation). Then, 700 parts of ion-exchanged water was further added at a rate of 8 g/min and amorphous resin 1 fine particles were made to deposit. Thereafter, tetrahydrofuran was removed by using an evaporator and the concentration was adjusted by using ion-exchanged water to obtain a water-based dispersion liquid containing the amorphous resin 1 fine particles at a concentration of 20 mass % (amorphous resin 1 fine particle dispersion liquid).

The 50% particle diameter (D50) in terms of volume of the amorphous resin 1 fine particles was 0.14 μm.

[Production of Wax Fine Particle Dispersion Liquid]

| | |
|---|---|
| Wax 1 (Fischer-Tropsch wax; peak temperature of maximum endothermic peak is 90° C.) | 100.0 parts |
| Anionic surfactant NEOGEN RK (manufactured by DKS Co. Ltd.) | 5 parts |
| Ion-exchanged water | 395 parts |

The aforementioned materials were weighed and loaded into a mixing container having an agitation device. Then, the materials were heated to 90° C. and circulated to a CLEAR- MIX W-Motion (manufactured by M-Technique Co., Ltd.) to be subjected to a dispersion process for 60 minutes. Conditions of the dispersion process were as follows.

Rotor outer diameter: 3 cm

Clearance: 0.3 mm

Rotation speed of rotor: 19,000 r/min

Rotation speed of screen: 19,000 r/min

After the dispersion process, the dispersed product was cooled to 40° C. under such cooling conditions that the rotation speed of the rotor was 1,000 r/min, the rotation speed of the screen was 0 r/min, and the cooling rate was 10° C./min, and a water-based dispersion liquid containing wax fine particles at a concentration of 20 mass % (wax fine particle dispersion liquid) was thereby obtained.

The 50% particle diameter (D50) in terms of volume of the wax fine particles was measured by using the dynamic light scattering particle size analyzer NANOTRAC UPA-EX150 (manufactured by Nikkiso Co., Ltd.) and was 0.15 μm.

[Production of Colorant Fine Particle Dispersion Liquid]

| | |
|---|---|
| Colorant 1 (cyan pigment manufactured by Dainichiseika Color & Chemicals Mfg. Co., Ltd.: Pigment Blue 15:3) | 50.0 parts |
| Anionic surfactant NEOGEN RK (manufactured by DKS Co. Ltd.) | 7.5 parts |
| Ion-exchanged water | 442.5 parts |

The aforementioned materials were weighed, mixed, and dissolved and was dispersed for about 1 hour by using the high-pressure impact disperser Nano-Mizer (manufactured by Yoshida Kikai Co., Ltd.) to obtain a water-based dispersion liquid obtained by dispersing the colorant and containing the colorant fine particles at a concentration of 10 mass % (colorant fine particle dispersion liquid).

The 50% particle diameter (D50) in terms of volume of the colorant fine particles was measured by using the dynamic light scattering particle size analyzer NANOTRAC UPA-EX150 (manufactured by Nikkiso Co., Ltd) and was 0.20 μm.

Toner particles were produced in the following methods by using the dispersion liquids produced in the aforementioned methods.

[Production of Toner Particle 1]

| | |
|---|---|
| Crystalline resin 1 fine particle dispersion liquid | 60.0 parts |
| Amorphous resin 1 fine particle dispersion liquid | 40.0 parts |
| Wax fine particle dispersion liquid | 5.0 parts |
| Colorant fine particle dispersion liquid | 9.0 parts |
| Ion-exchanged water | 20.0 parts |
| Post-treatment crystalline resin 1 fine particle dispersion liquid | 3.0 parts |

The aforementioned materials except for the post-treatment crystalline resin 1 fine particle dispersion liquid were loaded into a stainless-steel round flask and mixed. Next, the materials were agitated at 5,000 r/min for 10 minutes by using a homogenizer ULTRA-TURRAX T50 (manufactured by IKA) to be dispersed. Thereafter, a 1.0% nitric acid aqueous solution was added to adjust pH to 3.0 and then the mixture liquid was heated to 58° C. while being agitated by using an agitation blade in a heating water bath with the rotation speed adjusted as necessary. Formed aggregated particles were checked as appropriate by using Coulter Multisizer III and the mixture liquid was maintained until the weight-average particle diameter (D4) reached about 6.4 μm. Thereafter, the post-treatment crystalline resin 1 fine particle dispersion liquid was added and the mixture liquid was held for another 30 minutes. Then, pH was adjusted to 9.0 by using a 5% sodium hydroxide aqueous solution.

Thereafter, the mixture liquid was heated to 75° C. while being continuously agitated. Then, the mixture liquid was maintained at 75° C. for one hour to fuse the aggregated particles together.

Next, the mixture liquid was cooled to 50° C. and maintained for 3 hours to promote crystallization of the resin.

Thereafter, the mixture liquid was cooled to 25° C., subjected to filtration and solid-liquid separation, then sufficiently cleaned with ion-exchanged water, and dried to obtain a toner particle 1. The weight-average particle diameter (D4) of the toner particle 1 was about 6.0 μm, the average circularity was 0.975, and the domain diameter was 200 nm.

<Example of Production of Toner Particle 2>

In this example of production, toner particles were produced by using the melt-kneading-pulverizing method.

| | |
|---|---|
| Crystalline resin 1 | 60.0 parts |
| Amorphous resin 1 | 40.0 parts |
| Wax 1 (Fischer-Tropsch wax; melting point is 90° C.) | 5.0 parts |
| Colorant 1 (cyan pigment manufactured by Dainichiseika Color & Chemicals Mfg. Co., Ltd Pigment Blue 15:3) | 9.0 parts |

The materials were mixed using a Henschel mixer (model FM-75, manufactured by Nippon Coke & Engineering Co., Ltd.) with a rotation speed of 20 $s^{-1}$ and a rotation time of 5 min, and thereafter were kneaded at a screw rotation speed of 250 rpm and at a discharge temperature of 130° C. using a twin-screw kneader (model PCM-30, manufactured by Ikegai Corporation) in which the temperature was set to 130° C. The obtained kneaded product was rolled and cooled with a drum flaker (MBD30-30, manufactured by Nippon Coke & Engineering Co., Ltd.). The conditions were set such that the temperature of cooling water was set to 15° C. and the thickness of the resin composition after the rolling and cooling was 1.0 mm. Time the temperature took to reach or fall below the melting point Tp of the crystalline resin after the melting was (10 seconds) and the cooling rate in a period in which the temperature took to reach or fall below the melting point Tp of the crystalline resin after the rolling was (7° C./second). The rolled and cooled product was coarsely pulverized to a size of 1 mm or less by using a hammer mill to obtain a coarsely-pulverized product. The coarsely-pulverized product thus obtained was finely pulverized using a mechanical pulverizer (T-250, manufactured by FREUND-TURBO CORPORATION).

Then, the finely-pulverized product was classified using Faculty F-300 (manufactured by Hosokawa Micron Corporation) to obtain a toner particle 2 having a weight-average particle diameter of about 6.0 μm, an average circularity of 0.965, and a domain diameter of 200 nm. The classification operation conditions were such that the rotation speed of the classification rotor was set to 130 $s^{-1}$ and the rotation speed of the dispersion rotor was set to 120 $s^{-1}$.

<Example of Production of Toner Particles 3 to 24>

Toner particles 3 to 24 were obtained by performing production as in the example of production of the toner particle 2 except for changing the type and added parts of the crystalline resin, the type and added parts of the amorphous resin, and the kneading conditions to those described in Table 2.

TABLE 2

| Toner | Crystalline resin | | Amorphous resin | | Kneading conditions | | Domain Diameter |
|---|---|---|---|---|---|---|---|
| particle No. | No. | Parts | No. | Parts | Discharge temperature [° C.] | Rotation speed [rpm] | nm |
| 1 | 1 | 60.0 | 1 | 40.0 | — | — | 200 |
| 2 | 1 | 60.0 | 1 | 40.0 | 130 | 250 | 200 |
| 3 | 1 | 60.0 | 2 | 40.0 | 130 | 250 | 200 |
| 4 | 1 | 60.0 | 1 | 40.0 | 110 | 300 | 25 |
| 5 | 1 | 60.0 | 1 | 40.0 | 100 | 320 | 15 |
| 6 | 1 | 60.0 | 1 | 40.0 | 145 | 180 | 480 |
| 7 | 1 | 60.0 | 1 | 40.0 | 150 | 140 | 520 |
| 8 | 2 | 100.0 | — | — | 130 | 250 | — |
| 9 | 3 | 60.0 | 1 | 40.0 | 130 | 250 | 200 |
| 10 | 4 | 60.0 | 1 | 40.0 | 130 | 250 | 200 |
| 11 | 4 | 85.0 | 1 | 15.0 | 130 | 250 | 200 |
| 12 | 11 | 50.0 | 1 | 50.0 | 130 | 250 | 200 |
| 13 | 5 | 60.0 | 1 | 40.0 | 130 | 250 | 200 |
| 14 | 6 | 60.0 | 1 | 40.0 | 130 | 250 | 200 |
| 15 | 7 | 60.0 | 1 | 40.0 | 130 | 250 | 200 |
| 16 | 1 | 60.0 | 1 | 40.0 | 130 | 250 | 200 |
| 17 | 1 | 60.0 | 1 | 40.0 | 130 | 250 | 200 |
| 18 | 1 | 60.0 | 1 | 40.0 | 130 | 250 | 200 |
| 19 | 1 | 60.0 | 1 | 40.0 | 130 | 250 | 200 |
| 20 | 1 | 60.0 | 1 | 40.0 | 130 | 250 | 200 |
| 21 | 8 | 80.0 | 1 | 20.0 | 130 | 250 | 200 |
| 22 | 9 | 50.0 | 1 | 50.0 | 130 | 250 | 200 |
| 23 | 10 | 100.0 | — | — | 130 | 250 | — |
| 24 | 7 | 60.0 | 1 | 40.0 | 130 | 250 | 200 |

* Since the toner particle 1 was formed by emulsion aggregation method, there were no kneading conditions.

<Example of Production of Organic Silicon Polymer Particles 1>

1. Hydrolysis Step:

First, 43.2 parts of RO water and 0.008 parts of acetic acid as a catalyst were charged into a 200 ml beaker and were agitated at 45° C. Then, 27.2 g of tetraethoxysilane and 27.2 parts of dimethyldimethoxysilane were added to this mixture and was agitated for 1.5 hours to obtain a raw-material solution.

2. Condensation Polymerization Step:

First, 68.8 parts of RO water, 340.0 parts of methanol, and 2.0 parts of 25% ammonium water were loaded into a 1,000 ml beaker and were agitated at 30° C. to prepare an alkaline water-based medium. The raw-material solution obtained in the aforementioned hydrolysis step was dropped in 1 minute into the alkaline water-based medium. The mixed liquid after the dropping of the raw-material solution was agitated for 1.5 hours with the temperature maintained at 30° C. to promote condensation polymerization, and a condensation polymerization liquid was obtained.

3. Particle Formation Step

First, 1000 parts of RO water was loaded into a 2000 ml beaker and the condensation polymerization liquid obtained in the aforementioned condensation polymerization step was dropped into the RO water in 10 minutes while the RO water was agitated at 25° C. When the condensation polymerization liquid mixed with water, the condensation polymerization liquid immediately became cloudy and a dispersion liquid including silicon polymer particles having a siloxane bond was obtained.

4. Hydrophobing Step:

First, 27.1 parts of hexamethyldisilazane was added as a hydrophobing agent to the dispersion liquid obtained in the aforementioned particle formation step and including the silicon polymer particles having the siloxane bond, and was agitated for 2.5 hours at 60° C. Then, the mixture was left to stand for 5 minutes and powder precipitated in a lower portion of the solution was collected by suction filtration and dried under reduced pressure at 120° C. for 24 hours to obtain an organic silicon polymer particle 1. The Young's modulus of the primary particle of the obtained organic silicon polymer particle 1 was 6,200 MPa. The physical properties of the organic silicon polymer particle 1 that is the toner external additive are illustrated in Table 3.

<Example of Production of Organic Silicon Polymer Particles 2 to 11>

Organic silicon polymer particles 2 to 11 were obtained by performing production as in the example of production of the organic silicon polymer particle 1 except for changing the configuration of the monomers added in the hydrolysis step to those described in Table 3.

TABLE 3

| Organic silicon polymer | Monomer configuration (mol %) | | | | $^{29}$Si-NMR | | | Young's modulus | Number-average particle diameter |
|---|---|---|---|---|---|---|---|---|---|
| particle No. | Q unit | T unit | D unit | M unit | S4/SA | S3/SA | S2/SA | (MPa) | (nm) |
| 1 | 37 | — | 63 | — | 0.37 | 0.00 | 0.63 | 6200 | 120 |
| 2 | 23 | 34 | 43 | — | 0.23 | 0.34 | 0.43 | 5800 | 120 |
| 3 | 41 | 40 | 19 | — | 0.41 | 0.40 | 0.19 | 6800 | 120 |
| 4 | 21 | 60 | 19 | — | 0.21 | 0.60 | 0.19 | 6300 | 120 |

TABLE 3-continued

| Organic silicon polymer particle No. | Monomer configuration (mol %) Q unit | T unit | D unit | M unit | $^{29}$Si-NMR S4/SA | S3/SA | S2/SA | Young's modulus (MPa) | Number-average particle diameter (nm) |
|---|---|---|---|---|---|---|---|---|---|
| 5 | — | 100 | — | — | 0.00 | 1.00 | 0.00 | 6200 | 120 |
| 6 | 7 | 93 | — | — | 0.07 | 0.93 | 0.00 | 10000 | 120 |
| 7 | — | 90 | 10 | — | 0.00 | 0.90 | 0.10 | 2500 | 120 |
| 8 | 45 | 34 | 21 | — | 0.45 | 0.34 | 0.21 | 8200 | 120 |
| 9 | — | 90 | — | 10 | 0.00 | 0.90 | 0.00 | 1300 | 120 |
| 10 | 32 | 68 | — | — | 0.32 | 0.68 | 0.00 | 24000 | 120 |

<Example of Production of Toner 1>

| | |
|---|---|
| Toner particle 1 | 100 parts |
| Organic silicon polymer particle 1 | 5.0 parts |

The above materials were mixed using a Henschel mixer model FM-10C (manufactured by Mitsui Miike Chemical Engineering Machinery Co., Ltd.) at a rotation speed of 30 $s^{-1}$ for a rotation time of 10 min to obtain a toner 1. The obtained toner was formed into a pellet and the Young's modulus thereof was measured, which was 1,700 MPa.

<Example of Production of Toners 2 to 35>

Toners 2 to 35 were obtained by performing production as in the example of production of the toner 1 except for changing the types and parts of the toner particle and the organic silicon polymer particle to those described in Table 4. For the production of the toner 35, however, 5.0 parts of silica fine particle (number-average particle diameter: 120 nm, Young's modulus: 71000 MPa) was used in place of the organic silicon polymer particle.

TABLE 4

| Toner No. | Toner No. particle | Organic silicon polymer particle No. | Parts | Young's modulus MPa | SiE/TE | Average circularity | Weight-average particle diameter D4 µm |
|---|---|---|---|---|---|---|---|
| 1 | 1 | 1 | 5.0 | 1700 | 3.6 | 0.975 | 6.0 |
| 2 | 2 | 1 | 5.0 | 1700 | 3.6 | 0.965 | 6.0 |
| 3 | 3 | 1 | 5.0 | 1700 | 3.6 | 0.965 | 6.0 |
| 4 | 2 | 2 | 5.0 | 1700 | 3.4 | 0.965 | 6.0 |
| 5 | 2 | 3 | 5.0 | 1700 | 4.0 | 0.965 | 6.0 |
| 6 | 2 | 4 | 5.0 | 1700 | 3.7 | 0.965 | 6.0 |
| 7 | 2 | 5 | 5.0 | 1700 | 3.6 | 0.965 | 6.0 |
| 8 | 2 | 6 | 5.0 | 1700 | 5.9 | 0.965 | 6.0 |
| 9 | 2 | 7 | 5.0 | 1700 | 1.5 | 0.965 | 6.0 |
| 10 | 4 | 1 | 5.0 | 1700 | 3.6 | 0.965 | 6.0 |
| 11 | 5 | 1 | 5.0 | 1700 | 3.6 | 0.965 | 6.0 |
| 12 | 6 | 1 | 5.0 | 2100 | 3.0 | 0.965 | 6.0 |
| 13 | 7 | 1 | 5.0 | 2450 | 2.5 | 0.965 | 6.0 |
| 14 | 8 | 1 | 5.0 | 820 | 7.6 | 0.965 | 6.0 |
| 15 | 9 | 1 | 5.0 | 2070 | 3.0 | 0.965 | 6.0 |
| 16 | 10 | 1 | 5.0 | 2200 | 2.8 | 0.965 | 6.0 |
| 17 | 11 | 1 | 5.0 | 1980 | 3.1 | 0.965 | 6.0 |
| 18 | 12 | 1 | 5.0 | 2300 | 2.7 | 0.965 | 6.0 |
| 19 | 13 | 1 | 5.0 | 1400 | 4.4 | 0.965 | 6.0 |
| 20 | 14 | 1 | 5.0 | 1100 | 5.6 | 0.965 | 6.0 |
| 21 | 15 | 1 | 5.0 | 2300 | 2.7 | 0.965 | 6.0 |
| 22 | 16 | 1 | 0.6 | 1700 | 3.6 | 0.965 | 6.0 |
| 23 | 17 | 1 | 0.3 | 1700 | 3.6 | 0.965 | 6.0 |
| 24 | 18 | 1 | 18.0 | 1700 | 3.6 | 0.965 | 6.0 |
| 25 | 19 | 1 | 22.0 | 1700 | 3.6 | 0.965 | 6.0 |
| 26 | 20 | 1 | 5.0 | 1700 | 3.6 | 0.965 | 6.0 |
| 27 | 21 | 8 | 5.0 | 850 | 9.6 | 0.965 | 6.0 |
| 28 | 21 | 9 | 5.0 | 850 | 1.5 | 0.965 | 6.0 |
| 29 | 22 | 10 | 5.0 | 2450 | 9.8 | 0.965 | 6.0 |
| 30 | 22 | 11 | 5.0 | 2450 | 1.6 | 0.965 | 6.0 |
| 31 | 23 | 1 | 5.0 | 780 | 7.9 | 0.965 | 6.0 |
| 32 | 24 | 1 | 5.0 | 2600 | 2.4 | 0.965 | 6.0 |
| 33 | 21 | 6 | 5.0 | 850 | 11.8 | 0.965 | 6.0 |
| 34 | 22 | 7 | 5.0 | 2450 | 1.0 | 0.965 | 6.0 |
| 35 | 2 | — | — | 1700 | 41.8 | 0.965 | 6.0 |

<Example of Production of Magnetic Carrier 1>

A magnetite 1 having a number-average particle diameter of 0.30 µm, (the intensity of magnetization under a magnetic field of 1000/4π (kA/m) was 65 $Am^2/kg$)

A magnetite 2 having a number-average particle diameter of 0.50 µm, (the intensity of magnetization under a magnetic field of 1000/4π (kA/m) was 65 $Am^2/kg$)

To 100 parts of each of the above materials, 4.0 parts of a silane compound (3-(2-aminoethyl aminopropyl) trimethoxysilane) was added, followed by high-speed mixing and agitating at 100° C. or more in a container to treat fine particles of each material.

Phenol: 10 mass %

Formaldehyde solution: 6 mass % (40 mass % of formaldehyde, 10 mass % of methanol, and 50 mass % of water)

The magnetite 1 treated with the above silane compound: 58 mass %

The magnetite 2 treated with the above silane compound: 26 mass %

100 parts of the above materials, 5 parts of an aqueous solution of 28 mass % ammonia, and 20 parts of water were introduced into a flask, and the temperature was increased to 85° C. over 30 minutes and maintained while agitating and mixing, thereby causing a polymerization reaction for 3 hours to cure the phenolic resin generated.

Thereafter, the cured phenolic resin was cooled down to 30° C., water was further added thereto, and thereafter, the supernatant liquid was removed, and the precipitate was washed with water and dried with air.

Subsequently, this was dried at a temperature of 60° C. under a reduced pressure (5 mmHg or less) to obtain a magnetic body-dispersed spherical magnetic carrier 1. The 50% particle diameter (D50) in terms of volume of the magnetic carrier 1 was 34.2 μm.

<Example of Production of Two-Component Developer 1>

To 92.0 parts of the magnetic carrier 1, 8.0 parts of the toner 1 was added, followed by mixing using a V-type mixer (V-20, manufactured by Seishin Enterprise) to obtain a two-component developer 1.

<Example of Production of Two-Component Developers 2 to 35>

Two-component developers 2 to 35 were obtained by performing production as in the example of production of the two-component developer 1 except for changing the toner to those described in Table 5.

Example 1

Evaluation was performed by using the aforementioned two-component developer 1.

[Low-Temperature Fusibility]

As an image forming apparatus, a modified machine of image RUNNER ADVANCE C5560 that is a printer for commercial digital printing manufactured by Canon Inc. and that includes an intermediate transfer body was used, and the two-component developer 1 was put in a cyan developing device. Modification points of the apparatus were that fusing temperature, process speed, DC voltage VDC of a developer carrier, charge voltage VD of an electrostatic latent image carrier, and laser power were changed to be able to be freely set. In image output evaluation, an FFh image (solid image) with a desired aspect ratio was outputted, VDC, VD, and the laser power were adjusted such that an amount of toner placed on the FFh image on paper became a desired amount, and the low-temperature fusibility was evaluated.

FFh is a value expressing 256 gradations in hexadecimal and 00 h is the first gradation (white background portion) in the 256 gradations while FFh is the 256th gradation (solid portion) in the 256 gradations Evaluation was performed based on the following evaluation method and results of the evaluation are illustrated in Table 5.

Paper: GFC-081 (81.0 g/m$^2$)

(sold by Canon Marketing Japan Inc.)

Amount of toner placed on paper: 0.70 mg/cm$^2$ (adjusted by changing the DC voltage VDC of the developer carrier, the charge voltage VD of the electrostatic latent image carrier, and the laser power)

Evaluation image: an image of 2 cm×5 cm was arranged in a center of the above A4 paper.

Test environment: an environment with a low temperature and a low humidity: temperature 15° C./humidity 10% RH (hereinafter "L/L")

Fusing temperature: 140° C.

Process speed: 400 mm/sec

The aforementioned evaluation image was outputted to evaluate the low-temperature fusibility. The value of the percentage of decrease in image density was used as criteria for evaluation of low-temperature fusibility.

The percentage of decrease in image density was obtained as follows:

First, using X-rite color reflection densitometer (500 series: manufactured by X-Rite Inc.), first, an image density in a center portion was measured. Next, the fused image in the portion where the image density was measured was rubbed (5 reciprocations) using Silbon paper with a load of 4.9 kPa (50 g/cm$^2$), and the image density was measured again.

Then, the percentage of decrease in image density between before and after the rubbing was calculated by using the following formula. The obtained percentage of decrease in image density was evaluated according to the following evaluation criteria. The evaluation results are illustrated in Table 5.

Percentage of decrease in image density=(image density before rubbing)−(image density after rubbing/(image density before rubbing)×100

(Evaluation Criteria)

AA: percentage of decrease in image density was less than 1.0%.

A: percentage of decrease in image density was 1.0% or more and less than 3.0%.

B: percentage of decrease in image density was 3.0% or more and less than 5.0%.

C: percentage of decrease in image density was 5.0% or more and less than 8.0%.

D: percentage of decrease in image density was 8.0% or more.

[Transferability (Non-Electrostatic Adhering Force)

As an image forming apparatus, a modified machine of image RUNNER ADVANCE C5255 that is a full-color copier manufactured by Canon Inc. and that includes an intermediate transfer body was used. A solid image was outputted in an environment with ordinary temperature and ordinary humidity (temperature 23° C., relative humidity 50%).

A transfer residual toner on a photosensitive drum in solid image formation was taped with a transparent polyester adhesive tape and the tape was peeled off. The peeled-off adhesive tape was attached to paper and the density of this tape was measured with a spectrodensitometer 500 series (X-Rite Inc.). Moreover, the adhesive tape alone was attached to the paper and the density in this case was also measured. A density difference obtained by subtracting the latter density from the former density was calculated and the calculated density difference was evaluated based on the following evaluation criteria. Evaluation results of non-electrostatic adhesive force in an initial stage are illustrated in Table 5.

Copy paper Multi-Purpose Paper: so-called voice paper (A4, basis weight 75 g/m$^2$, sold by Canon USA) was used as evaluation paper. Effects of the present invention was determined to obtained in the case where rating was C or higher.

(Evaluation Criteria of Transferability)

A: density difference was less than 0.05.

B: density difference was 0.05 or more and less than 0.10.

C: density difference was 0.10 or more and less than 0.20.

D: density difference was 0.20 or more.

Next, the toner was supplied at a fixed amount such that the toner density was constant in an image with a print ratio of 1% and 70,000 (70 k) pages of the image were outputted. CS-680 (A4, basis weight 68 g/$m^2$, sold by Canon Marketing Japan Inc.) was used as image output paper.

After completion of 70 k durable use, operation similar to that for the non-electrostatic adhering force in the initial stage was performed to evaluate the transferability. Evaluation results of non-electrostatic adhering force after long-period durable use are illustrated in Table 5.

Examples 2 to 30 and Comparative Examples 1 to 5

Evaluation of low-temperature fusibility and transferability was performed as in Example 1 except for using the two-component developers 2 to 35 instead of the two-component developer 1. Evaluation results are illustrated in Table 5.

TABLE 5

| | | | | Low-temperature fusibility | | Non-electrostatic adhering force | | | |
|---|---|---|---|---|---|---|---|---|---|
| | | | | | | Initial stage | | After long-period durable use | |
| | Developer No. | Toner No. | Magnetic Carrier No. | Decrease percentage [%] | Evaluation | Density change | Evaluation | Density change | Evaluation |
| Example 1 | 1 | 1 | 1 | 0.7 | AA | 0.01 | A | 0.02 | A |
| Example 2 | 2 | 2a | 1 | 0.7 | AA | 0.01 | A | 0.01 | A |
| Example 3 | 3 | 3 | 1 | 0.8 | AA | 0.01 | A | 0.02 | A |
| Example 4 | 4 | 4 | 1 | 0.7 | AA | 0.01 | A | 0.01 | A |
| Example 5 | 5 | 5 | 1 | 0.7 | AA | 0.01 | A | 0.03 | A |
| Example 6 | 6 | 6 | 1 | 0.7 | AA | 0.01 | A | 0.03 | A |
| Example 7 | 7 | 7 | 1 | 0.7 | AA | 0.01 | A | 0.04 | A |
| Example 8 | 8 | 8 | 1 | 0.7 | AA | 0.01 | A | 0.05 | B |
| Example 9 | 9 | 9 | 1 | 0.7 | AA | 0.01 | A | 0.12 | C |
| Example 10 | 10 | 10 | 1 | 0.6 | AA | 0.01 | A | 0.08 | B |
| Example 11 | 11 | 11 | 1 | 0.6 | AA | 0.01 | A | 0.11 | C |
| Example 12 | 12 | 12 | 1 | 2.5 | A | 0.01 | A | 0.03 | A |
| Example 13 | 13 | 13 | 1 | 3.1 | B | 0.01 | A | 0.04 | A |
| Example 14 | 14 | 14 | 1 | 0.5 | AA | 0.01 | A | 0.18 | C |
| Example 15 | 15 | 15 | 1 | 2.4 | A | 0.01 | A | 0.01 | A |
| Example 16 | 16 | 16 | 1 | 3.2 | B | 0.01 | A | 0.03 | A |
| Example 17 | 17 | 17 | 1 | 2.0 | A | 0.01 | A | 0.02 | A |
| Example 18 | 18 | 18 | 1 | 4.4 | B | 0.01 | A | 0.04 | A |
| Example 19 | 19 | 19 | 1 | 0.6 | AA | 0.01 | A | 0.07 | B |
| Example 20 | 20 | 20 | 1 | 0.5 | AA | 0.01 | A | 0.13 | C |
| Example 21 | 21 | 21 | 1 | 5.5 | C | 0.02 | A | 0.04 | A |
| Example 22 | 22 | 22 | 1 | 0.5 | AA | 0.05 | B | 0.09 | B |
| Example 23 | 23 | 23 | 1 | 0.5 | AA | 0.07 | B | 0.11 | C |
| Example 24 | 24 | 24 | 1 | 4.5 | B | 0.01 | A | 0.01 | A |
| Example 25 | 25 | 25 | 1 | 5.7 | C | 0.01 | A | 0.01 | A |
| Example 26 | 26 | 26 | 1 | 1.6 | A | 0.01 | A | 0.01 | A |
| Example 27 | 27 | 27 | 1 | 0.5 | AA | 0.01 | A | 0.18 | C |
| Example 28 | 28 | 28 | 1 | 0.5 | AA | 0.01 | A | 0.12 | C |
| Example 29 | 29 | 29 | 1 | 3.5 | B | 0.01 | A | 0.17 | C |
| Example 30 | 30 | 30 | 1 | 3.5 | B | 0.01 | A | 0.11 | C |
| Comparative Example 1 | 31 | 31 | 1 | 0.5 | AA | 0.01 | A | 0.22 | D |
| Comparative Example 2 | 32 | 32 | 1 | 10.3 | D | 0.02 | A | 0.06 | B |
| Comparative Example 3 | 33 | 33 | 1 | 0.5 | AA | 0.01 | A | 0.33 | D |
| Comparative Example 4 | 34 | 34 | 1 | 3.5 | B | 0.01 | A | 0.24 | D |
| Comparative Example 5 | 35 | 35 | 1 | 0.7 | AA | 0.05 | B | 0.48 | D |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-098007, filed Jun. 11, 2021, and Japanese Patent Application No. 2022-077313, filed May 10, 2022, which are hereby incorporated by reference herein in their entirety.

What is claimed is:

1. A toner, comprising:

a toner particle containing a binder resin, the binder resin containing a crystalline resin; and an organic silicon polymer particle on a surface of the toner particle, wherein $800 \leq TE \leq 2500$ and $1.5 \leq SiE/TE \leq 10.0$ when TE (MPa) is a Young's modulus measured with a micro compression tester at 25° C. using a test piece obtained by pelletizing the toner and SiE (MPa) is a Young's modulus measured with the micro compression tester at 25° C. using the organic silicon polymer particle separated from the toner, and $0.20 \le S4/SA \le 0.60$, $0.00 \le S3/SA \le 0.50$ and $0.20 \le S2/SA \le 0.70$ when SA is a total peak area derived from an organic silicon polymer in a measurement of $^{29}$Si-NMR using the organic silicon polymer particle as a specimen, S4 is a peak area derived from a Q unit structure, S3 is a peak area derived from a T unit structure, and S2 is a peak area derived from a D unit structure.

2. The toner according to claim 1, wherein a content of the crystalline resin is 50 mass % or more based on the binder resin.

3. The toner according to claim 1, wherein a content of the organic silicon polymer particle is 0.5 to 20 parts by mass with respect to 100 parts by mass of the toner particle.

4. The toner according to claim 1, wherein the toner has a diffraction peak in a range in which a diffraction angle 2θ is 20.0 to 22.0° in an X-ray diffraction spectrum using a CuKα line.

5. The toner according to claim 1, wherein the crystalline resin includes a monomer unit represented by formula (1)

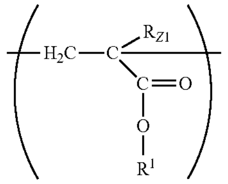

(1)

where $R_{Z1}$ represents a hydrogen atom or a methyl group and $R^1$ represents an alkyl group having 18 to 36 carbon atoms, and a proportion of the monomer unit is 30.0 mass % or more based on a mass of the crystalline resin.

6. The toner according to claim 1, wherein the toner particle includes an amorphous resin, a domain of the amorphous resin is observed in a cross section of the toner particle observed with a transmission electron microscope, and a number-average particle diameter of the domain present in the cross section within a range of 800 nm from a surface of the toner particle is 20 to 500 nm.

7. The toner according to claim 1, wherein an average circularity of the toner particle is 0.930 to 0.980.

* * * * *